United States Patent [19]
Morikawa et al.

[11] Patent Number: 6,109,224
[45] Date of Patent: Aug. 29, 2000

[54] VALVE TIMING CONTROL APPARATUS FOR AN INTERNAL COMBUSTION ENGINE

[75] Inventors: Junya Morikawa, Toyota; Daiji Isobe, Toyohashi, both of Japan

[73] Assignee: Denso Corporation, Kariya, Japan

[21] Appl. No.: 09/152,269

[22] Filed: Sep. 14, 1998

[30] Foreign Application Priority Data

Sep. 24, 1997 [JP] Japan ............................... 9-258692
May 15, 1998 [JP] Japan ............................. 10-133814

[51] Int. Cl.⁷ .................................................. F01L 1/34
[52] U.S. Cl. ................................. 123/90.15; 123/90.17
[58] Field of Search ............................. 123/90.15, 90.16, 123/90.17, 90.31

[56] References Cited

U.S. PATENT DOCUMENTS

| | | | |
|---|---|---|---|
| 5,199,403 | 4/1993 | Akazaki et al. | 123/478 |
| 5,215,061 | 6/1993 | Ogawa et al. | 123/478 |
| 5,417,191 | 5/1995 | Togai et al. | 123/333 |
| 5,606,960 | 3/1997 | Takahashi et al. | 123/684 |
| 5,644,073 | 7/1997 | Matsuno et al. | 73/118.1 |
| 5,713,317 | 2/1998 | Yoshioka | 123/90.15 |

FOREIGN PATENT DOCUMENTS

| | | |
|---|---|---|
| 5-33715 | 2/1993 | Japan . |
| 07091280 | 4/1995 | Japan . |
| 7-68921 | 7/1995 | Japan . |

*Primary Examiner*—Weilun Lo
*Attorney, Agent, or Firm*—Nixon & Vanderhye P.C.

[57] ABSTRACT

An ECU calculates an actual relative rotational angle in a VVT based on a crank angle signal sent from a crank position sensor and a cam angle signal sent from a cam position sensor. Furthermore, the ECU calculates a fundamental target relative rotational angle based on engine operating conditions. The fundamental target relative rotational angle is corrected by a factor responsive to the change of the air-fuel ratio. Thus, a control rotational angle fed to the VVT varies in accordance with the change of the air-fuel ratio so as to stabilize the combustion and improve the power output characteristics.

3 Claims, 18 Drawing Sheets

GN
(g/rev)

|  |  |  |  |
|---|---|---|---|
|  |  |  |  |
| VTTBSEm | VTTBSEm+1 |  |  |
|  |  |  |  |
|  |  |  |  |
|  |  |  |  |

NE (rpm)

FIG. 3

| $\lambda TG$ | 0.8 | 0.9 | 1.0 | 1.1 | 1.2 | 1.3 | 1.4 |
|---|---|---|---|---|---|---|---|
| $\lambda c$ | 0.6 | 0.8 | 1.0 | 0.8 | 0.5 | 0.2 | 0.0 |

FIG. 4

| VTT[°CA] | 0 | 10 | 20 | 30 | 40 | 50 | 60 |
|---|---|---|---|---|---|---|---|
| VTTc | 1.0 | 1.0 | 0.9 | 0.8 | 0.5 | 0.2 | 0.0 |
FIG. 13
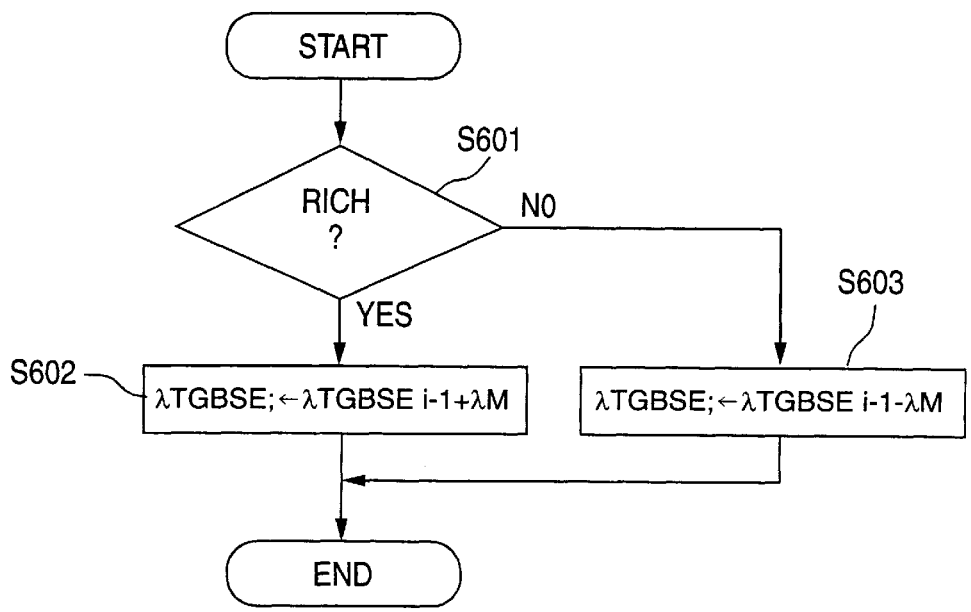
FIG. 14
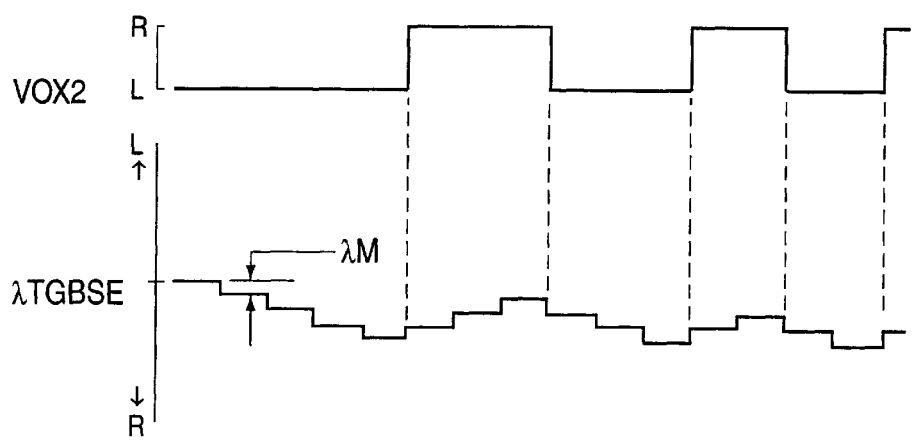
FIG. 15

VALVE TIMING CONTROL APPARATUS FOR AN INTERNAL COMBUSTION ENGINE

BACKGROUND OF THE INVENTION

The present invention relates to a valve timing control apparatus for an internal combustion engine comprising a variable valve timing control mechanism capable of optimizing an open or close timing of at least one of intake and exhaust valves in accordance with engine operating conditions, and an air-fuel control device capable of varying an air-fuel ratio of gas mixture introduced into a combustion chamber of the internal combustion engine.

Unexamined Japanese Patent Application No. Kokai 7-91280, published in 1995, discloses a valve timing control apparatus for an internal combustion engine including a hydraulically controlled variable valve timing control mechanism wherein a control amount is adjustable in accordance with oil nature to improve drivability. Japanese Patent No. 7-68921, published in 1995, discloses another hydraulically controlled variable valve timing control mechanism wherein a control amount is variable to stabilize an idle operating condition of an internal combustion engine.

This kind of valve timing control apparatus may be incorporated into a so-called lean burn type internal combustion engine equipped with an air-fuel ratio control device which flexibly varies the air-fuel ratio of gas mixture introduced into a combustion chamber. However, undesirable change of the valve timing of the intake or exhaust valve leads to unstable combustion during a lean bum control mode. For example, advancing the valve timing of an intake valve will increase an overlap between the opening period of an exhaust valve and the opening period of the intake valve. The increased overlap between the intake and exhaust valve opening periods possibly increases a residual exhaust gas amount remaining in the combustion chamber. In other words, a so-called internal EGR amount is increased, while worsening the combustion or causing a misfire. This greatly worsens the emission and the drivability.

SUMMARY OF THE INVENTION

In view of the problems encountered in the prior art, an object of the present invention is to provide a valve timing control apparatus for an internal combustion engine capable of stabilizing the combustion even in a lean burn control mode and improving the power output characteristics.

In order to accomplish this and other related objects, according to one aspect of the present invention, a variable valve timing control device is provided in the driving force transmitting mechanism for allowing a relative angular displacement between the driving shaft and the driven shaft within a predetermined angle. A control rotational angle setting means is provided for setting a control rotational angle required for optimizing the relative angular displacement in accordance with operating conditions of the internal combustion engine. A relative angular displacement means is provided for causing the variable valve timing control device to angularly dislocate at least one of the driving shaft and the driven shaft based on the control rotational angle. An air-fuel ratio changing means is provided for adjusting an air-fuel ratio in accordance with the operating conditions of the internal combustion engine. And, a control rotational angle correcting means is provided for correcting the control rotational angle set by the control rotational angle setting means in accordance with the air-fuel ratio adjusted by the air-fuel ratio changing means.

Furthermore, according to another aspect of the present invention, an air-fuel ratio changing means is provided for adjusting an air-fuel ratio in accordance with the operating conditions of the internal combustion engine. And, an air-fuel ratio correcting means is provided for correcting the air-fuel ratio adjusted by the air-fuel ratio changing means in accordance with the control rotational angle set by the control rotational angle setting means.

Preferably, the valve timing control apparatus further comprises a driving shaft rotational angle detecting means for detecting a rotational angle of the driving shaft and a driven shaft rotational angle detecting means for detecting a rotational angle of the driven shaft. A relative rotational angle calculating means is provided for calculating a relative rotational angle representing an angular phase difference between the rotational angle of the driving shaft detected by the driving shaft rotational angle detecting means and the rotational angle of the driven shaft detected by the driven shaft rotational angle detecting means, A target relative rotational angle calculating means is provided for calculating a target relative rotational angle representing a target angular phase difference between the rotational angle of the driving shaft and the rotational angle of the driven shaft in accordance with the operating conditions of the internal combustion engine. And, the control rotational angle setting means is for setting the control rotational angle in accordance with a deviation between the relative rotational angle calculated by the relative rotational angle calculating means and the target relative rotational angle calculated by the target relative rotational angle calculating means.

Preferably, the control rotational angle correcting means is for correcting the control rotational angle toward a retard side when the air-fuel ratio is shifted to a lean side or for setting the control rotational angle to a most-retard position when the air-fuel ratio is shifted to a lean side.

Preferably, the air-fuel ratio correcting means is for correcting the air-fuel ratio to a stoichiometric air-fuel ratio when the control rotational angle is in an advance side.

Furthermore, according to another aspect of the present invention, the valve timing control apparatus comprises a first catalytic converter disposed in an exhaust passage of the internal combustion engine for purifying carbon monoxide, hydrocarbon, and nitrogen oxides contained in exhaust gas during a stoichiometric control mode for the air-fuel ratio, and a second catalytic converter disposed in the exhaust passage of the internal combustion engine for purifying nitrogen oxides contained in exhaust gas during a lean control mode for the air-fuel ratio. A control region judging means is provided for judging whether present engine operating conditions are in a stoichiometric control region or in a lean control region. A target air-fuel ratio calculating means is provided for calculating a target air-fuel ratio in accordance with a judgement by the control region judging means. An air-fuel ratio changing means is provided for adjusting the air-fuel ratio to the target air-fuel ratio by selectively using the first catalytic converter and the second catalytic converter corresponding to the target air-fuel ratio calculated by the target air-fuel ratio calculating means, thereby purifying the exhaust gas. Furthermore, a target relative rotational angle calculating means is provided for calculating the target relative rotational angle in response to the air-fuel ratio adjusted by the air-fuel ratio changing means. A control rotational angle setting means is provided for setting a control rotational angle required for optimizing the relative angular displacement in accordance with a deviation between the relative rotational angle and the target relative rotational angle. And, a relative rotational angle control means is provided for causing the variable valve timing control device to adjust the relative angular displacement between the driving shaft and the driven shaft in accordance with the control rotational angle.

Preferably, the target air-fuel ratio calculating means and the target relative rotational angle calculating means are for calculating the target air-fuel ratio and the target relative rotational angle based on an engine speed and an intake air amount of the internal combustion engine.

BRIEF DESCRIPTION OF THE DRAWINGS

The above and other objects, features and advantages of the present invention will become more apparent from the following detailed description which is to be read in conjunction with the attached drawings, in which:

FIG. 3 is a map used for calculating a fundamental target relative rotational angle based on an engine speed and an intake air amount used in the first embodiment of the present invention;

FIG. 4 is a map used for calculating a correction factor corresponding to a target air-fuel ratio used in the first embodiment of the present invention;

FIG. 13 is a map showing a correction factor corresponding to the target relative rotational angle used in the second embodiment of the present invention;

FIG. 14 is a flowchart showing a processing procedure for setting the fundamental target air-fuel ratio in accordance with the second embodiment of the present invention;

FIG. 15 is a time chart showing a transition of the fundamental target air-fuel ratio in response to the output of the oxygen sensor in accordance with the second embodiment of the present invention;

DESCRIPTION OF THE PREFERRED EMBODIMENTS

Figure 1:
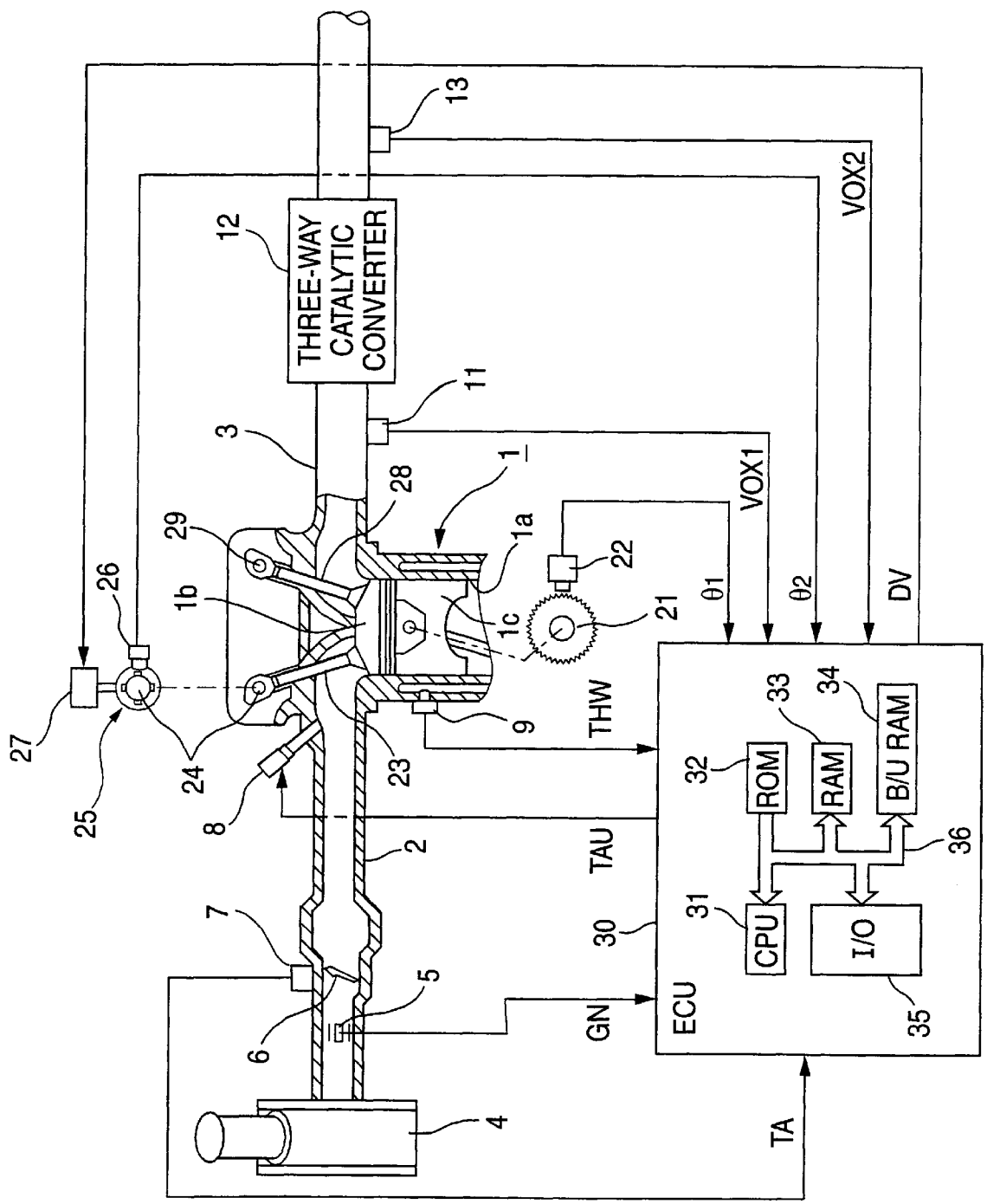
FIG. 1 is a schematic view showing a double overhead cam type internal combustion engine equipped with a valve timing control apparatus and related actuating and sensing devices in accordance with first and second embodiments of the present invention.

Preferred embodiments of the present invention will be explained hereinafter with reference to the attached drawings. Identical parts are denoted by the same reference numerals throughout the views.

First Embodiment

FIG. 1 is a double overhead cam type internal combustion engine equipped with a valve timing control apparatus and related actuating and sensing devices in accordance with a first embodiment of the present invention.

An internal combustion engine 1 comprises a plurality of cylinders 1a respectively connected to an intake passage 2 and an exhaust passage 3. An air cleaner 4 is provided at an upstream side of the intake passage 2. An air flow meter 5 detects an amount of air introduced through the air cleaner 4. A throttle valve 6, provided downstream of the air flow meter 5, is rotatable about its shaft supported at a wall of the intake passage 2. An intake air amount is increased or decreased by opening or closing the throttle valve 6. A throttle sensor 7 detects an opening degree of the throttle valve 6. A downstream side of the intake passage is divided into a plurality of independent passages exclusively communicating with the corresponding cylinders 1a. Each independent passage is provided with a fuel injector 8, electromagnetically controlled by an electronic control unit (hereinafter, referred to as ECU) 30 in accordance with engine operating conditions. The fuel injected from the fuel injector 8 is atomized or vaporized when mixed with the introduced air or heated by a hot wall of the intake passage.

Then, the fuel and the intake air are introduced as gas mixture into a combustion chamber 1b of each cylinder 1a defined by a piston 1c slidably accommodated in each cylinder 1a.

A water temperature sensor 9, provided at the housing of the internal combustion engine 1, detects the temperature of cooling water flowing around the cylinder 1a. An A/F sensor 11, provided in the exhaust passage 3, generates an air-fuel ratio signal VOX1 proportional to an air-fuel ratio of the exhaust gas flowing in the exhaust passage 3. A three-way catalytic converter 12 is positioned downstream of the A/F sensor 11. An oxygen ($O_2$) sensor 13, disposed downstream of the three-way catalytic converter 12, generates a voltage signal VOX2 in response to an oxygen density of the exhaust gas (i.e., lean or rich with respect to a stoichiometric air-fuel ratio).

The three-way catalytic converter 12 comprises a catalytic element, such as platinum or rhodium, and additive such as, cerium and lanthanum. The activated catalytic converter 12 purifies harmful components, such as carbon monoxide (CO), hydrocarbon (HC) and nitrogen oxides (NOx), contained in exhaust gas.

An intake valve 23 opens or closes an intake port of the combustion chamber 1b communicating with the intake passage 2. A cam shaft 24, pushing or lifting the intake valve 23 in its axial direction against a resilient force of a spring associated with the intake valve, is connected to a variable valve timing control mechanism (hereinafter, referred to as "VVT") 25 that is hydraulically driven. More specifically, an oil-flow control valve (hereinafter, referred to as "OCV") 27 adjusts a hydraulic pressure of operating fluid (i.e., oil) supplied to the VVT 25 so as to equalize a present relative angular displacement (i.e., actual relative angular displacement) between the cam shaft 24 and the crank shaft 21 to a target relative angular displacement representing a target phase difference between the cam shaft 24 and the crank shaft 21. According to the first embodiment, no VVT is connected to a cam shaft 29 of an exhaust valve 28 which opens or closes an exhaust port of the combustion chamber 1b communicating with the exhaust passage 3. A driving force transmitting mechanism (not shown) transmits a driving force of the internal combustion engine 1 from the crank shaft 21 to the cam shafts 24 and 29. An oil pump (not shown) supplies the operating fluid from the engine 1 to the OCV 27.

A crank position sensor 22, disposed adjacent to the crank shaft 21, detects a crank angel θ1. A cam position sensor 26, disposed adjacent to the cam shaft 24, detects a cam angel θ2.

The ECU 30 receives various sensor signals, including an intake air amount signal GN sent from the air flow meter 5, a throttle opening degree signal TA sent from the throttle sensor 7, a cooling water temperature signal THW sent from the water temperature sensor 9, the air-fuel ratio signal VOX1 sent from the A/F sensor 11, the voltage signal VOX2 sent from the oxygen sensor 13, the crank angel θ1 sent from the crank position sensor 22, and the cam angel θ2 sent from the cam position sensor 26.

The ECU 30 comprises a CPU 31 acting as a central processing unit, a ROM 32 storing control programs and control maps, a RAM 33 storing various data, a B/U (backup) RAM 34, and an I/O (input/output) circuit 35 inputting detection signals sent from the sensors and outputting control signals fed to various actuators. A bus 36 connects the above-described components of ECU 30 to allow mutual data transmission.

The ECU 30 calculates an engine speed NE and a control duty DV fed to the OCV 27 based on the crank angle signal θ1 sent from the crank position sensor 22. Furthermore, the ECU 30 makes a judgement as to whether the air-fuel ratio of the gas mixture is rich or lean based on the air-fuel ratio signal VOX1 sent from the A/F sensor 11. When the air-fuel ratio changes from rich to lean or vice versa, the ECU 30 increases or reduces a fuel injection amount TAU by giving a large stepwise change in the value of an air-fuel ratio F/B (feedback) correction factor FAF which is later described. The air-fuel ratio F/B correction factor FAF is gradually increased or decreased when the air-fuel ratio remains rich or lean. The above-described air-fuel ratio F/B control is stopped when the cooling water temperature is low or when the engine is operated in a high engine load/ high engine speed condition. Furthermore, the ECU 30 obtains a fundamental injection time based on the engine speed and the intake air amount. The obtained fundamental injection time is corrected by the FAF value or the like to obtain a final injection time. Then, the ECU 30 causes the fuel injector 8 to inject fuel corresponding to the final injection time at a predetermined injection timing.

Figure 2:
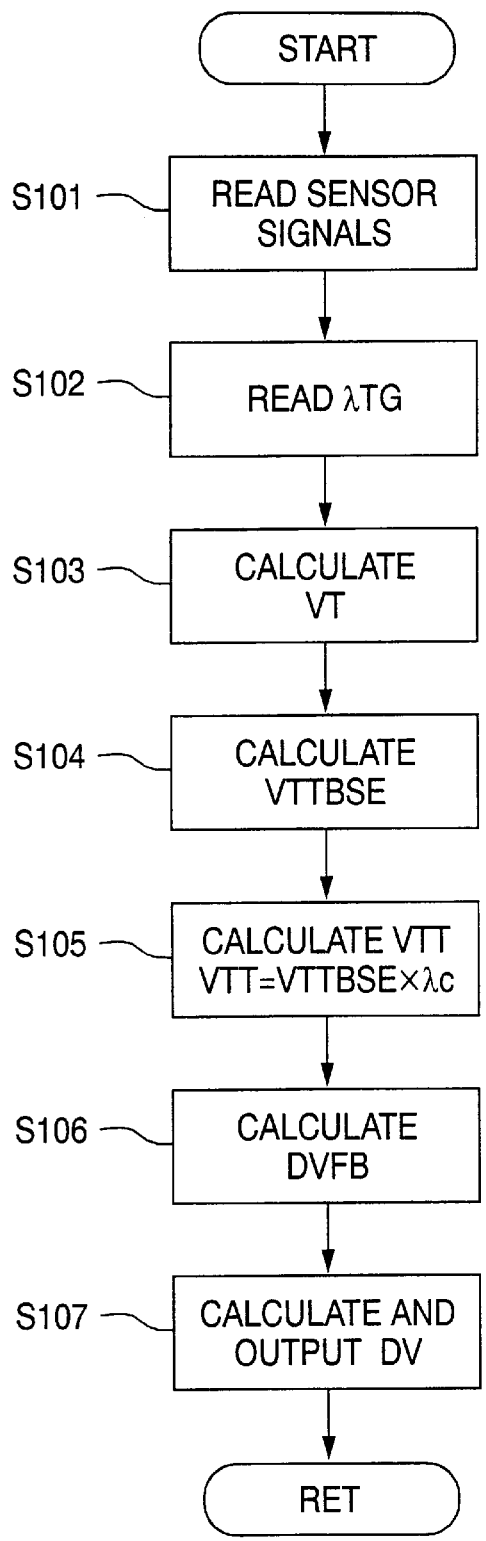
FIG. 2 is a flowchart showing a processing procedure performed for calculating a control duty in accordance with the first embodiment of the present invention.
Figure 5:
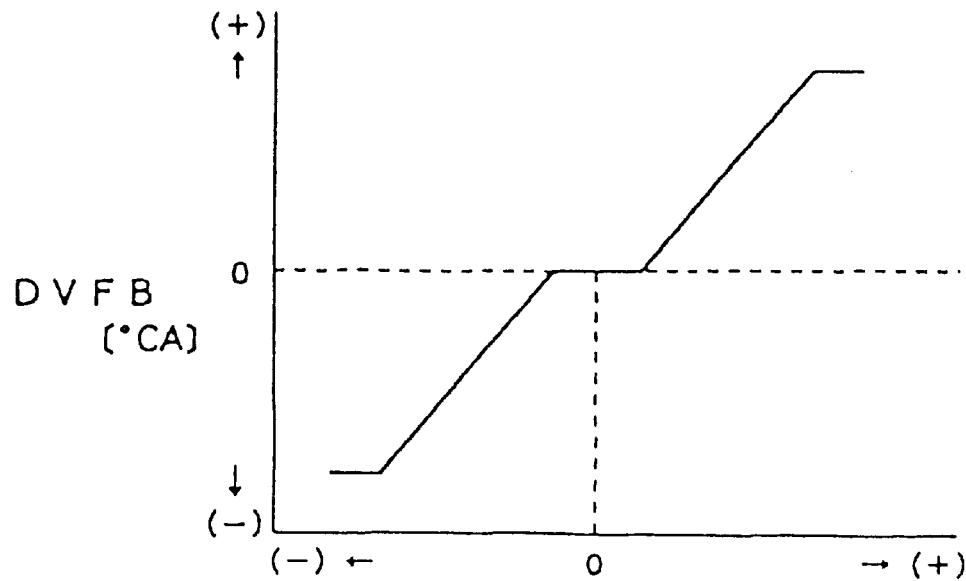
FIG. 5 is a map used for calculating a control rotational angle from a relative rotational angular deviation used in the first embodiment of the present invention.
Figure 6:
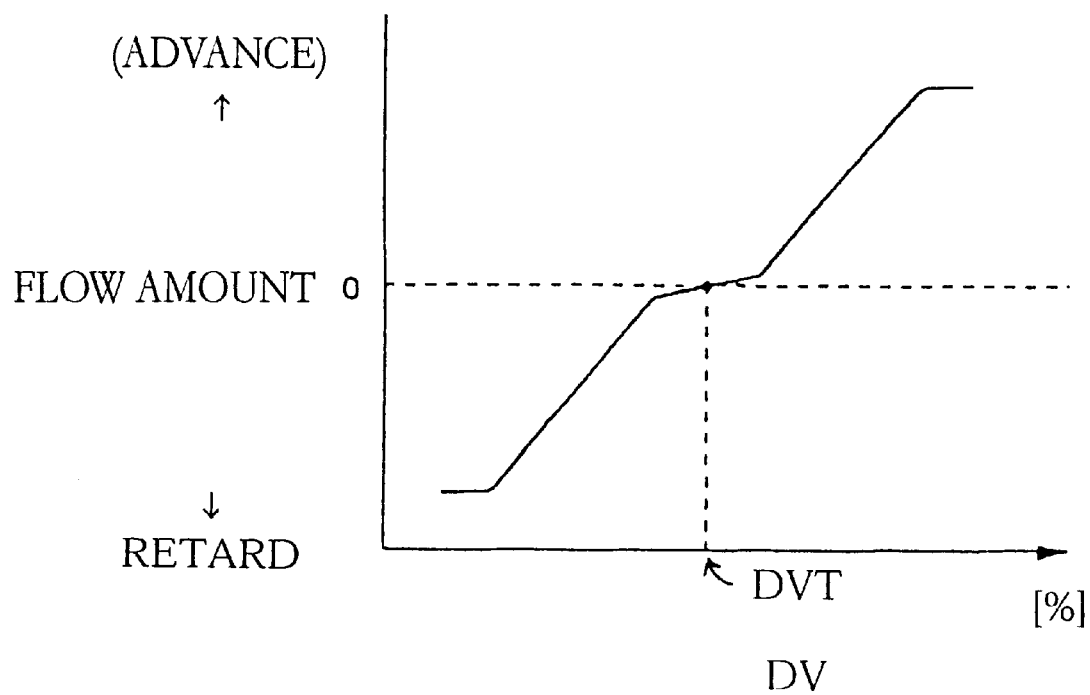
FIG. 6 is a map representing flow characteristics relative to the control duty used in the first embodiment of the present invention.

FIG. 2 is a flowchart showing a processing procedure performed in the CPU 31 of the ECU 30 for calculating the control duty (i.e., duty ratio) with reference to maps of FIGS. 3 through 6 in accordance with the first embodiment of the present invention. FIG. 3 is the map used for calculating a fundamental target relative rotational angle VTTBSE [° CA (crank angle)] based on the engine speed NE [rpm] and the intake air amount GN [g/rev]. FIG. 4 is the map used for calculating a correction factor λc based on a target air-fuel ratio λTG. FIG. 5 is the map (graph) used for calculating a control rotational angle DVFB [° CA] from a relative rotational angular deviation (VTT−VT) [° CA]. FIG. 6 is the map (graph) representing flow characteristics relative to the control duty DV [%] of the OCV 27. A retaining duty DVT shown in FIG. 6 represents a control duty required for maintaining an actual relative rotational angle VT corresponding to the present angular phase difference. The CPU 31 repetitively performs the control duty calculating routine shown in FIG. 2 at predetermined intervals.

In a step S101 of FIG. 2, the CPU 31 reads various sensor signals, including the crank angle signal θ1 sent from the crank position sensor 22, the cam angle signal θ2 sent from the cam position sensor 26, as well as the engine speed NE and the intake air amount GN representing engine operating conditions. Then, in a step S102, the CPU 31 reads the target air-fuel ratio λTG. Then, in a step S103, the CPU 31 calculates the actual relative rotational angle VT (=θ1−θ2) based on the crank angle signal θ1 of the crank position sensor 22 and the cam angle signal θ2 of the cam position sensor 26 read in the step S101.

Next, in a step S104, the CPU 31 calculates the fundamental target relative rotational angle VTTBSE corresponding to a present target phase difference based on the engine speed NE and the intake air amount GN read in the step S101 with reference to the map of FIG. 3. Then, in a step S105, the CPU 31 obtains the correction factor λc based on the target air-fuel ratio λTG read in the step S102. Then, the CPU 31 multiplies the correction factor λc with the fundamental target relative rotational angle VTTBSE calculated in the step S104 to obtain a target relative rotational angle VTT. Then, in a step S106, the CPU 31 calculates the control rotational angle DVFB as a F/B (feedback) correction amount based on the relative rotational angular deviation (VTT−VT) between the actual relative rotational angle VT calculated in the step S103 and the target relative rotational angle VTT calculated in the step S105 with reference to the map of FIG. 5.

Finally, in a step S107, the CPU 31 calculates the control duty DV based on the retaining duty DVT required for maintaining the actual relative rotational angle VT with reference to the map of FIG. 6. The calculated control duty DV is sent to the OCV 27 to adjust a hydraulic fluid amount supplied to the VVT 25. Then, the CPU 31 completes the routine of FIG. 2.

Figure 7:
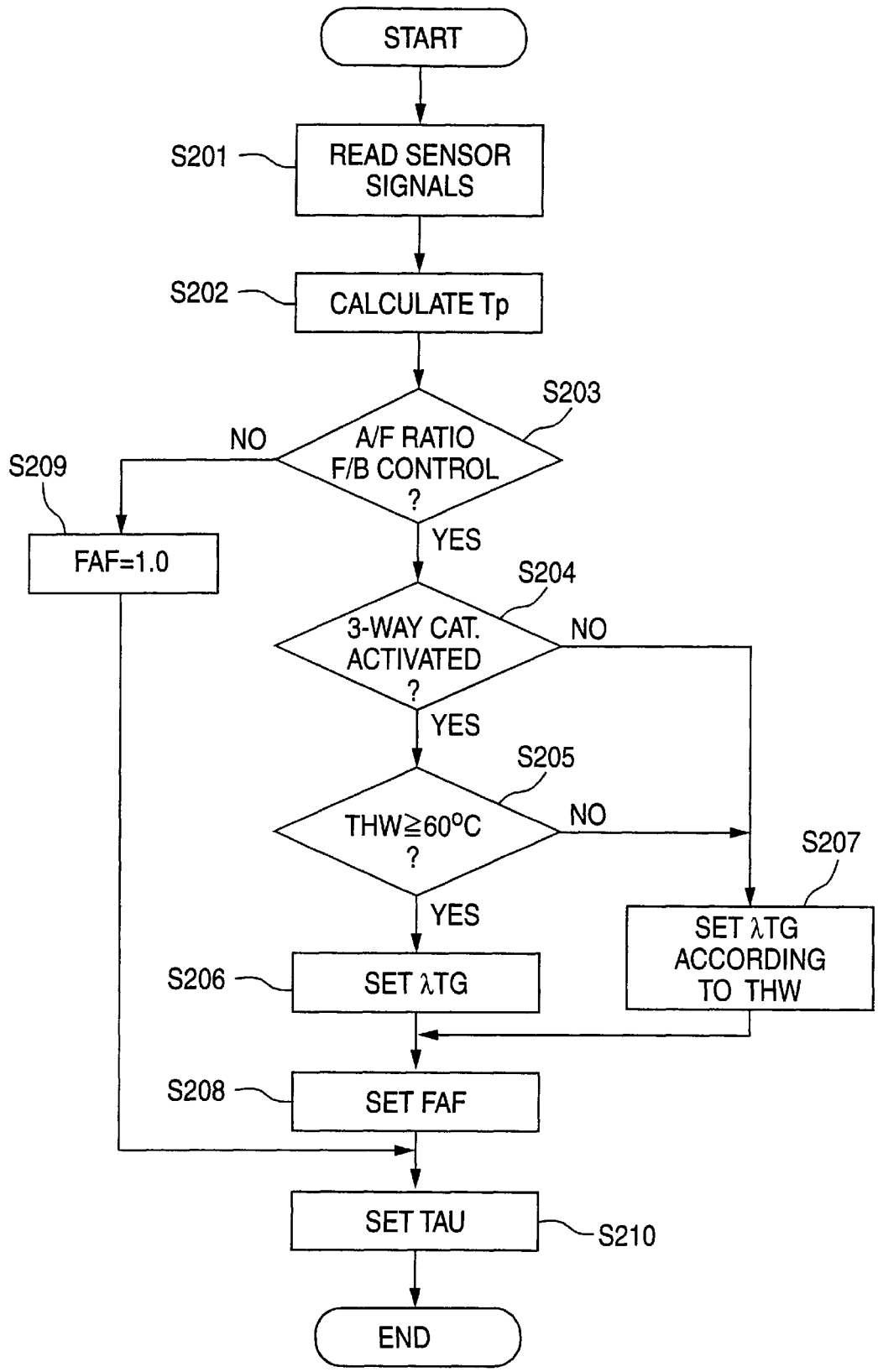
FIG. 7 is a flowchart showing a processing procedure for calculating a fuel injection amount in accordance with the first and second embodiments of the present invention.
Figure 8:
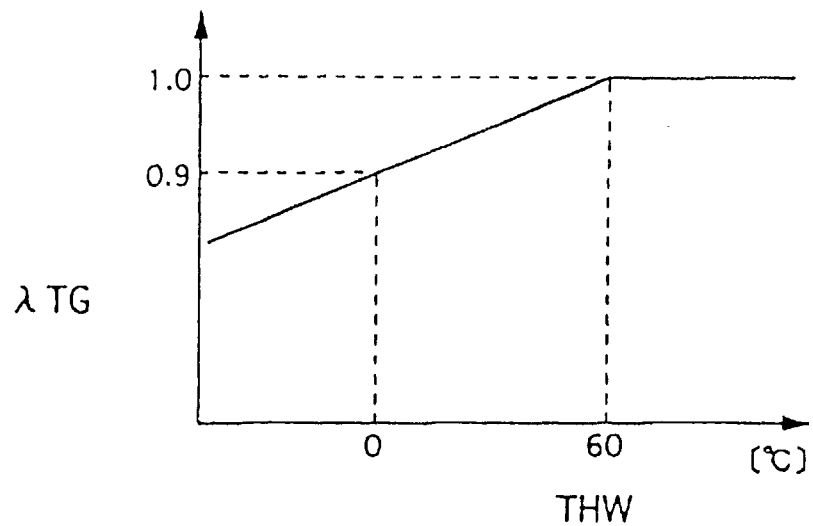
FIG. 8. is a map showing a relationship between the target air-fuel ratio and a cooling, water temperature used in the first embodiment of the present invention.

FIG. 7 is a flowchart showing a processing procedure performed in the CPU 31 of the ECU 30 for calculating the fuel injection amount with reference to a map FIG. 8 in accordance with the first embodiment of the present invention. FIG. 8 is the map (graph) showing a relationship between the target air-fuel ratio λTG and the cooling water temperature THW [° C]. The CPU 31 repetitively performs the fuel injection amount setting routine shown in FIG. 7 every 360 degrees [° CA] in synchronism with the rotation of the internal combustion engine 1.

In a step S201 of FIG. 7, the CPU 31 reads various sensor signals including the engine speed NE and the intake air amount GN. Next, in a step S202, the CPU 31 calculates a fundamental fuel injection amount Tp based on the various sensor signals read in the step S201. Then, in a step S203, the CPU 31 makes a judgement as to whether air-fuel ratio F/B (feedback) control conditions are established. According to the first embodiment, the air-fuel ratio F/B control conditions are established when:

the fuel increase amount is set to 0 [%] immediately after the engine is started;

no fuel cut is performed;

the engine is not operated in a high speed/high load region; and the A/F sensor 11 is in an activated condition.

When the air-fuel ratio F/B control conditions are established (i.e., YES) in the step S203, the CPU 31 proceeds to a step S204 to further make a judgement as to whether the three-way catalytic converter 12 is in an activated condition. When the judgement condition is established (i.e., YES) in the step S204, the CPU 31 proceeds to a step S205 to further make a judgement as to whether the cooling water temperature THW is equal to or larger than 60° C. When the judgement condition is established (i.e., YES) in the step S205, the CPU 31 proceeds to a step S206 to set the target air-fuel ratio λTG as described later in detail.

On the other hand, when judgement conditions in the steps S204 and S205 are not established (i.e., when the three-way catalytic converter 12 is not yet activated and the cooling water temperature THW is less than 60° C.), the CPU 31 proceeds to a step S207 to set the target air-fuel ratio λTG based on the cooling water temperature THW with reference to FIG. 8.

After setting the target air-fuel ratio λTG in the step S206 or S207, the CPU 31 proceeds to a step S208 to set the air-fuel ratio F/B correction factor FAF to equalize the air-fuel ratio λ to the target air-fuel ratio λTG. More specifically, in the step S208, the air-fuel ratio F/B correction factor FAF is set based on the target air-fuel ratio λTG and the air-fuel ratio signal VOX1 detected by the A/F sensor 11.

When the air-fuel ratio F/B control conditions are not established (i.e., NO) in the step S203, the CPU 31 proceeds to a step S209 to fix the air-fuel ratio F/B correction factor FAF to 1 (i.e., FAF=1.0).

After setting the air-fuel ratio F/B correction factor FAF in the step S208 or S209, the CPU 31 proceeds to a step S210 to set the fuel injection amount TAU based on the fundamental fuel injection amount TP, the air-fuel ratio F/B correction factor FAF and other correction factor FALL in accordance with the following equation (1).

$$TAU = TP \times FAF \times FALL \qquad (1)$$

Then, the CPU 31 completes the routine of FIG. 7.

A control signal, corresponding to the fuel injection amount TAU set in the step S210, is sent to the fuel injector 8 to control the valve opening time determining an actual fuel injection amount. As a result, the air-fuel ratio of the gas mixture introduced into the combustion chamber 1b is equalized to the target air-fuel ratio λTG.

Figure 9:
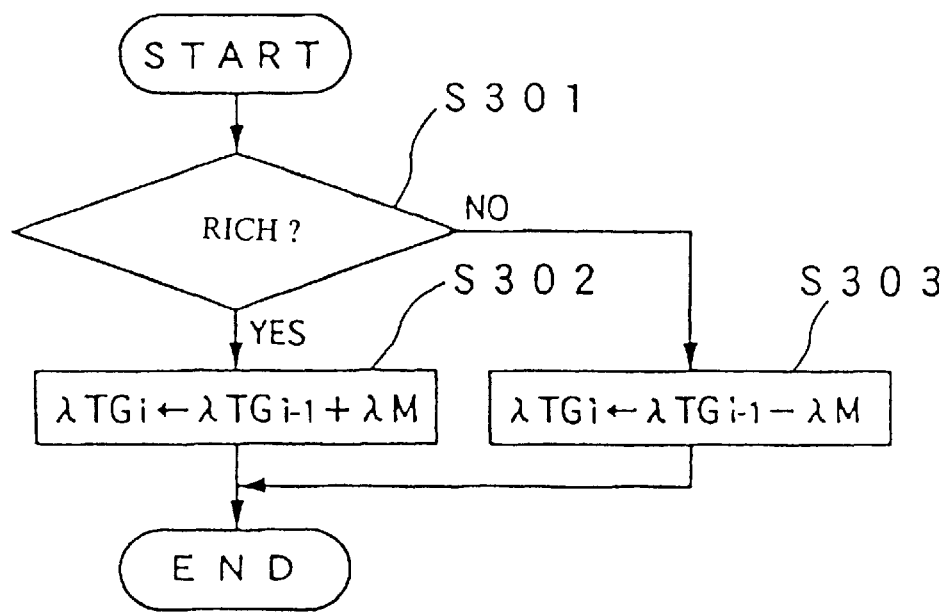
FIG. 9 is a flowchart showing a processing procedure for setting a target air-fuel ratio in accordance with the first embodiment of the present invention.
Figure 10:
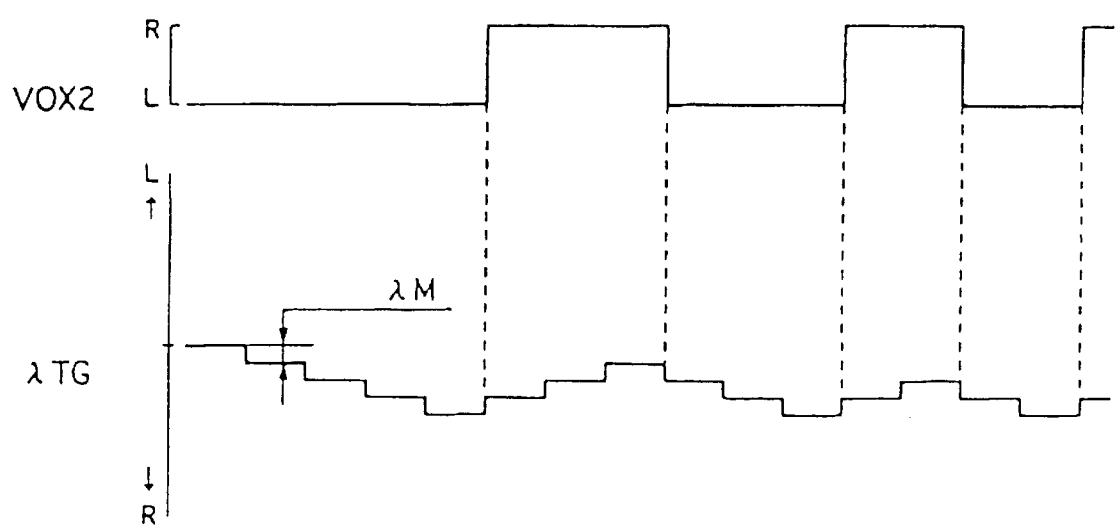
FIG. 10 is a time chart showing a transition of the target air-fuel ratio in response to an output of an oxygen sensor in accordance with the first embodiment of the present invention.

FIG. 9 is a flowchart showing a processing procedure performed in the CPU 31 of the ECU 30 for setting the target air-fuel ratio in the step S206 of FIG. 7 with reference to a time chart of FIG. 10 showing a transition (change) of the target air-fuel ratio λTG in response to the voltage signal VOX2 sent from the oxygen sensor 13. The CPU 31 repetitively performs the target air-fuel ratio setting routine shown in FIG. 9 every 360 degrees [° CA] in synchronism with the rotation of the internal combustion engine 1.

In a step S301 of FIG. 9, the CPU 31 makes a judgement as to whether the voltage signal VOX2 sent from the oxygen sensor 13 is rich (R). When the judgement condition is established (i.e., YES) in the step S301, the CPU 31 proceeds to a step S302 to obtain a present target air-fuel ratio $\lambda TG_i$ by adding a predetermined value λM to a previous target air-fuel ratio $\lambda TG_{i-1}$ (i.e., $\lambda TG_i \leftarrow \lambda TG_{i-1} + \lambda M$). Namely, the present target air-fuel ratio $\lambda TG_i$ is shifted to a lean (L) side compared with the previous target air-fuel ratio $\lambda TG_{i-1}$. On the other hand, when the judgement condition is not established (i.e., NO) in the step S301, the CPU 31 proceeds to a step S303 to obtain the present target air-fuel ratio $\lambda TG_i$ by subtracting the predetermined value λM from the previous target air-fuel ratio $\lambda TG_{i-1}$ (i.e., $\lambda TG_i \leftarrow \lambda TG_{i-1} - \lambda M$). Namely, the present target air-fuel ratio $\lambda TG_i$ is shifted to a rich (R) side compared with the previous target air-fuel ratio $\lambda TG_{i-1}$ (refer to FIG. 10). Then, the CPU 31 completes the routine of FIG. 9.

Figure 11:
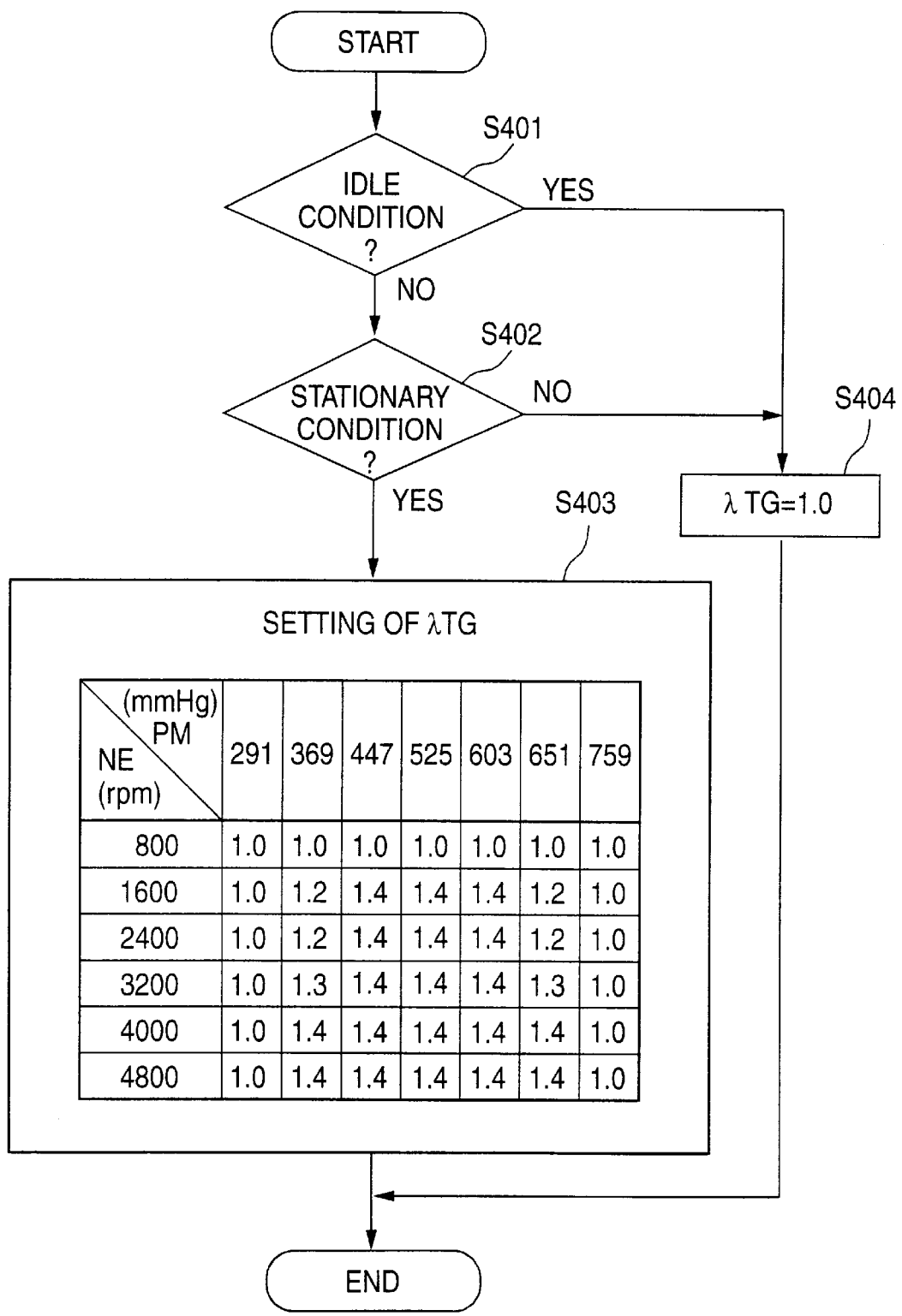
FIG. 11 is a flowchart showing a modified processing procedure for setting the target air-fuel ratio in accordance with the first embodiment of the present invention.

FIG. 11 is a flowchart showing a modified processing procedure performed in the CPU 31 of the ECU 30 for setting the target air-fuel ratio in the step S206 of FIG. 7. For this modified embodiment, the air flow meter 5 is replaced by an intake pressure detecting sensor (not shown) disposed downstream of the throttle valve 6 in the intake passage 2 to detect an intake pressure PM. The modified target air-fuel ratio setting routine shown in FIG. 11 is performed every 360 degrees [° CA] in synchronism with the rotation of the internal combustion engine 1.

In a step S401 of FIG. 11, the CPU 31 makes a judgement as to whether the engine is operated in an idle condition. When the judgement condition is not established (i.e., NO) in the step S401, the CPU 31 proceeds to a step S402 to further make a judgement as to whether the engine is operated in a predetermined stationary condition. According to the first embodiment, the stationary condition is established when:

an engine speed variation ΔNE (i.e., a variation of the engine speed NE) is less than 200 [rpm]; and an intake pressure variation ΔPM (i.e., a variation of the intake pressure PM) is less than 100 [mmHg].

When the judgement condition is established (i.e., YES) in the step S402, the CPU 31 proceeds to a step S403 to set the target air-fuel ratio λTG with reference to the map defined by the parameters of the engine speed NE [rpm] and the intake pressure PM [mmHg]. On the other hand, when the engine is operated in the idle condition (i.e., YES) in the step S401 or when the engine is not operated in the stationary condition (i.e., NO) in the step S402, the CPU 31 proceeds to a step S404 to fix the target air-fuel ratio λTG to 1 (i.e., λTG=1.0). Then, the CPU 31 completes the routine of FIG. 11.

As apparent from the foregoing description, the above-described first embodiment provides the valve timing control apparatus for an internal combustion engine comprising the crank shaft 21 serving as the driving shaft, the driving force transmitting mechanism (not shown) for transmitting the driving force from the crank shaft 21 to the cam shaft 24 serving as the driven shaft for opening or closing at least one of the intake and exhaust valves 23 and 28. The VVT 25 is provided in the driving force transmitting mechanism for allowing a relative angular displacement between the crank shaft 21 and the cam shaft 24 within a predetermined angle.

A control rotational angle setting means is realized by the CPU 31 of the ECU 30 for setting the control rotational angle DVFB required for optimizing the relative angular displacement in accordance with operating conditions of the internal combustion engine 1. A relative angular displacement means is realized by the CPU 31 of the ECU 30 for causing the VVT 25 to angularly dislocate at least one of the crank shaft 21 and the cam shaft 24 based on the control rotational angle DVFB.

An air-fuel ratio changing means is realized by the CPU 31 of the ECU 30 for adjusting the target air-fuel ratio λTG in accordance with the operating conditions of the internal combustion engine 1.

A control rotational angle correcting means is realized by the CPU 31 of the ECU 30 for correcting the control rotational angle DVFB set by the control rotational angle setting means in accordance with the target air-fuel ratio λTG adjusted by the air-fuel ratio changing means.

Furthermore, according to the valve timing control apparatus for an internal combustion engine disclosed in the above-described first embodiment, the crank position sensor 22 serves as a driving shaft rotational angle detecting means for detecting a rotational angle (i.e., crank angle θ1) of the crank shaft 21. The cam position sensor 26 serves as a driven shaft rotational angle detecting means for detecting a rotational angle (i.e., cam angel θ2) of the cam shaft 24.

A relative rotational angle calculating means is realized by the CPU 31 of the ECU 30 for calculating the actual relative rotational angle VT representing the angular phase difference between the rotational angel θ1 of the crank shaft 21 detected by the crank position sensor 22 and the rotational angle θ2 of the cam shaft 24 detected by the cam position sensor 26.

A target relative rotational angle calculating means is realized by the CPU 31 of the ECU 30 for calculating the fundamental target relative rotational angle VTTBSE representing the target angular phase difference between the rotational angel θ1 of the crank shaft 21 and the rotational angel θ2 of the cam shaft 24 in accordance with the engine speed NE and the intake air amount GN representing the operating conditions of the internal combustion engine 1.

The control rotational angle setting means is for setting the control rotational angle DVFB which is feedback controlled in accordance with a deviation (VTT−VT) between the actual relative rotational angle VT calculated by the relative rotational angle calculating means and the target relative rotational angle VTT calculated by the target relative rotational angle calculating means.

More specifically, the control rotational angle DVFB is corrected in the following manner. The fundamental target relative rotational angle VTTBSE is multiplied with the correction factor λc corresponding to the target air-fuel ratio λTG to obtain the target relative rotational angle VTT. The control rotational angle DVFB is set based on the deviation (VTT−VT) between the target relative rotational angle VTT and the actual relative rotational angle VT. In other words, the control rotational angle DVFB is corrected considering the target air-fuel ratio λTG. Accordingly, the VVT 25 receives the control rotational angle DVFB responsive to the change of the target air-fuel ratio λTG. This is effective to stabilize the combustion in the internal combustion engine 1 and to improve the power output of the internal combustion engine 1.

Furthermore, according to the valve timing control apparatus for an internal combustion engine disclosed in the above-described first embodiment, the control rotational angle correcting means realized by the CPU 31 of the ECU 30 is for correcting the control rotational angle DVFB toward the retard side when the target air-fuel ratio λTG is shifted to the lean side. In general, when the air-fuel ratio of the internal combustion engine is shifted to the lean side, the combustion becomes unstable. Hence, the control rotational angle DVFB fed to the VVT 25 is corrected to the retard side to reduce the overlap between the opening periods of the intake and exhaust valves 23 and 28. As a result, even when the air-fuel ratio of the internal combustion engine is shifted to the lean side to improve the fuel economy, the power output characteristics can be adequately maintained while the combustion is stabilized.

Furthermore, according to the valve timing control apparatus for an internal combustion engine disclosed in the above-described first embodiment, the control rotational angle correcting means realized by the CPU 31 of the ECU 30 is for setting the control rotational angle DVFB to the most-retard position when the target air-fuel ratio λTG is shifted to the lean side. As described above, when the air-fuel ratio of the internal combustion engine is shifted to the lean side, the combustion becomes unstable. Hence, the control rotational angle DVFB fed to the VVT 25 is shifted to the most-retard position which is the safest position. As a result, even when the air-fuel ratio of the internal combustion engine is shifted to the lean side to improve the fuel economy, the combustion is stabilized.

According to the above-described first embodiment, the target relative rotational angle is corrected in response to the change of the target air-fuel ratio. Thus, the combustion is stabilized without causing any misfire even when the air-fuel ratio of the internal combustion engine is shifted away from the stoichiometric (i.e., theoretical) value. However, the present invention is not limited to the above-described first embodiment, the same effects will be obtained when the target relative rotational angle is restricted within a predetermined range when the target air-fuel ratio is changed.

Second Embodiment

Figure 12:
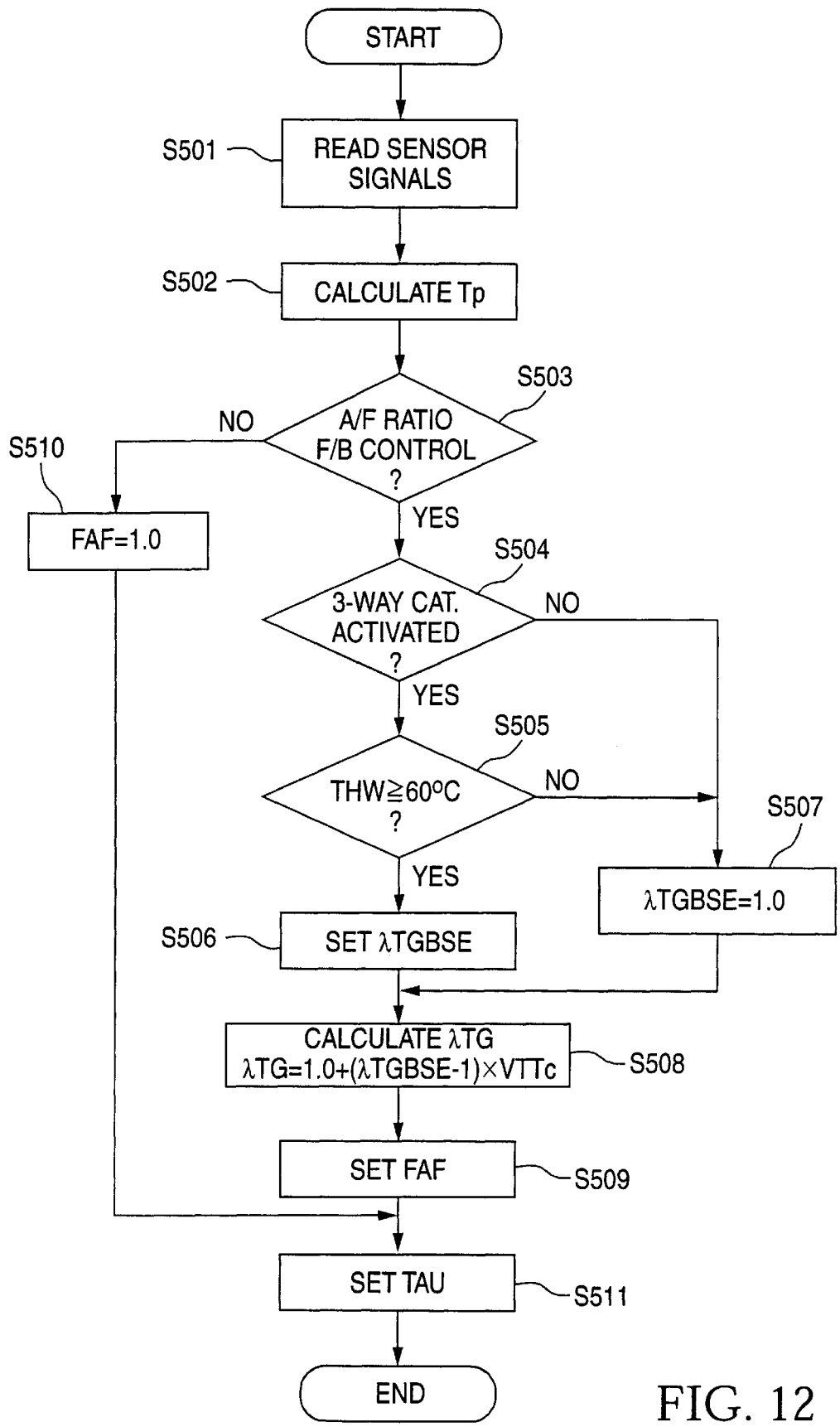
FIG. 12 is a flowchart showing a processing procedure for setting the fuel injection amount in accordance with a second embodiment of the present invention.

FIG. 12 is a flowchart showing a processing procedure performed in the CPU 31 of the ECU 30 for setting the fuel injection amount in accordance with a second embodiment of the present invention. The CPU 31 repetitively performs the fuel injection amount setting routine shown in FIG. 12 every 360 degrees [° CA] in synchronism with the rotation of the internal combustion engine 1. FIG. 13 is a map showing a correction factor VTTc corresponding to the target relative rotational angle VTT [° CA]. Like the first embodiment, the second embodiment is realized by using the valve timing control apparatus and the actuating and sensing devices shown in FIG. 1.

In a step S501 of FIG. 12, the CPU 31 reads various sensor signals including the engine speed NE and the intake air amount GN. Next, in a step S502, the CPU 31 calculates a fundamental fuel injection amount Tp based on the various sensor signals read in the step S501. Then, in a step S503, the CPU 31 makes a judgement as to whether air-fuel ratio F/B control conditions are established. Like the first embodiment, the air-fuel ratio F/B control conditions of the second embodiment are established when:

the fuel increase amount is set to 0 [%] immediately after the engine is started;

no fuel cut is performed;

the engine is not operated in a high speed/ high load region; and the A/F sensor 11 is in an activated condition.

When the air-fuel ratio F/B control conditions are established (i.e., YES) in the step S503, the CPU 31 proceeds to a step S504 to further make a judgement as to whether the three-way catalytic converter 12 is in an activated condition. When the judgement condition is established (i.e., YES) in the step S504, the CPU 31 proceeds to a step S505 to further make a judgement as to whether the cooling water temperature THW is equal to or larger than 60° C. When the judgement condition is established (i.e., YES) in the step S505, the CPU 31 proceeds to a step S506 to set a fundamental target air-fuel ratio λTGBSE as described later in detail.

On the other hand, when the judgement condition in the steps S504 and S505 are not established (i.e., when the three-way catalytic converter 12 is not yet activated and the cooling water temperature THW is less than 60° C.), the CPU 31 proceeds to a step S507 to fix the fundamental target air-fuel ratio λTGBSE to 1 (i.e., λTGBSE=1.0).

After setting the fundamental target air-fuel ratio λTGBSE in the step S506 or S507, the CPU 31 proceeds to a step S508 to calculate the target air-fuel ratio λTG based on the fundamental target air-fuel ratio λTGBSE and the correction factor VTTc corresponding to the target relative rotational angle VTT shown in FIG. 13 in accordance with the following equation (2).

$$\lambda TG = 1.0 + (\lambda TGBSE - 1) \times VTTc \qquad (2)$$

Next, the CPU 31 proceeds to a step S509 to set the air-fuel ratio F/B correction factor FAF to equalize the air-fuel ratio λ to the target air-fuel ratio λTG calculated in the step S508. More specifically, in the step S509, the air-fuel ratio F/B correction factor FAF is set based on the target air-fuel ratio λTG and the air-fuel ratio signal VOX1 detected by the A/F sensor 11.

When the air-fuel ratio F/B control conditions are not established (i.e., NO) in the step S503, the CPU 31 proceeds to a step S510 to fix the air-fuel ratio F/B correction factor FAF to 1 (i.e., FAF=1.0).

After setting the air-fuel ratio F/B correction factor FAF in the step S509 or S510, the CPU 31 proceeds to a step S511 to set the fuel injection amount TAU based on the fundamental fuel injection amount TP, the air-fuel ratio F/B correction factor FAF and other correction factor FALL in accordance with the above-described equation (1).

Then, the CPU 31 completes the routine of FIG. 12.

A control signal, corresponding to the fuel injection amount TAU set in the step S511, is sent to the fuel injector 8 to control the valve opening time determining an actual fuel injection amount. As a result, the air-fuel ratio of the gas mixture introduced into the combustion chamber 1b is equalized to the target air-fuel ratio λTG.

FIG. 14 is a flowchart showing a processing procedure performed in the CPU 31 of the ECU 30 for setting the fundamental target air-fuel ratio in the step S506 of FIG. 12 with reference to a time chart of FIG. 15 showing a transition (change) of the fundamental target air-fuel ratio λTGBSE in response to the voltage signal VOX2 sent from the oxygen sensor 13. The CPU 31 repetitively performs the fundamental target air-fuel ratio setting routine shown in FIG. 14 every 360 degrees [° CA] in synchronism with the rotation of the internal combustion engine 1.

In a step S601 of FIG. 14, the CPU 31 makes a judgement as to whether the voltage signal VOX2 sent from the oxygen sensor 13 is rich (R). When the judgement condition is established (i.e., YES) in the step S601, the CPU 31 proceeds to a step S602 to obtain a present fundamental target air-fuel ratio $\lambda TGBSE_i$ by adding a predetermined value λM to a previous fundamental target air-fuel ratio $\lambda TGBSE_{i-1}$ (i.e., $\lambda TGBSE_i \leftarrow \lambda TGBSE_{i-1} + \lambda M$). Namely, the present fundamental target air-fuel ratio $\lambda TGBSE_i$ is shifted to the lean (L) side compared with the previous fundamental target air-fuel ratio $\lambda TGBSE_{i-1}$. On the other hand, when the judgement condition is not established (i.e., NO) in the step S601, the CPU 31 proceeds to a step S603 to obtain the present fundamental target air-fuel ratio $\lambda TGBSE_i$ by subtracting the predetermined value λM from the previous fundamental target air-fuel ratio $\lambda TGBSE_{i-1}$ (i.e., $\lambda TGBSE_i \leftarrow \lambda TGBSE_{i-1} - \lambda M$). Namely, the present fundamental target air-fuel ratio $\lambda TGBSE_i$ is shifted to the rich (R) side compared with the previous fundamental target air-fuel ratio $\lambda TGBSE_{i-1}$ (refer to FIG. 15). Then, the CPU 31 completes the routine of FIG. 14.

Figure 16:
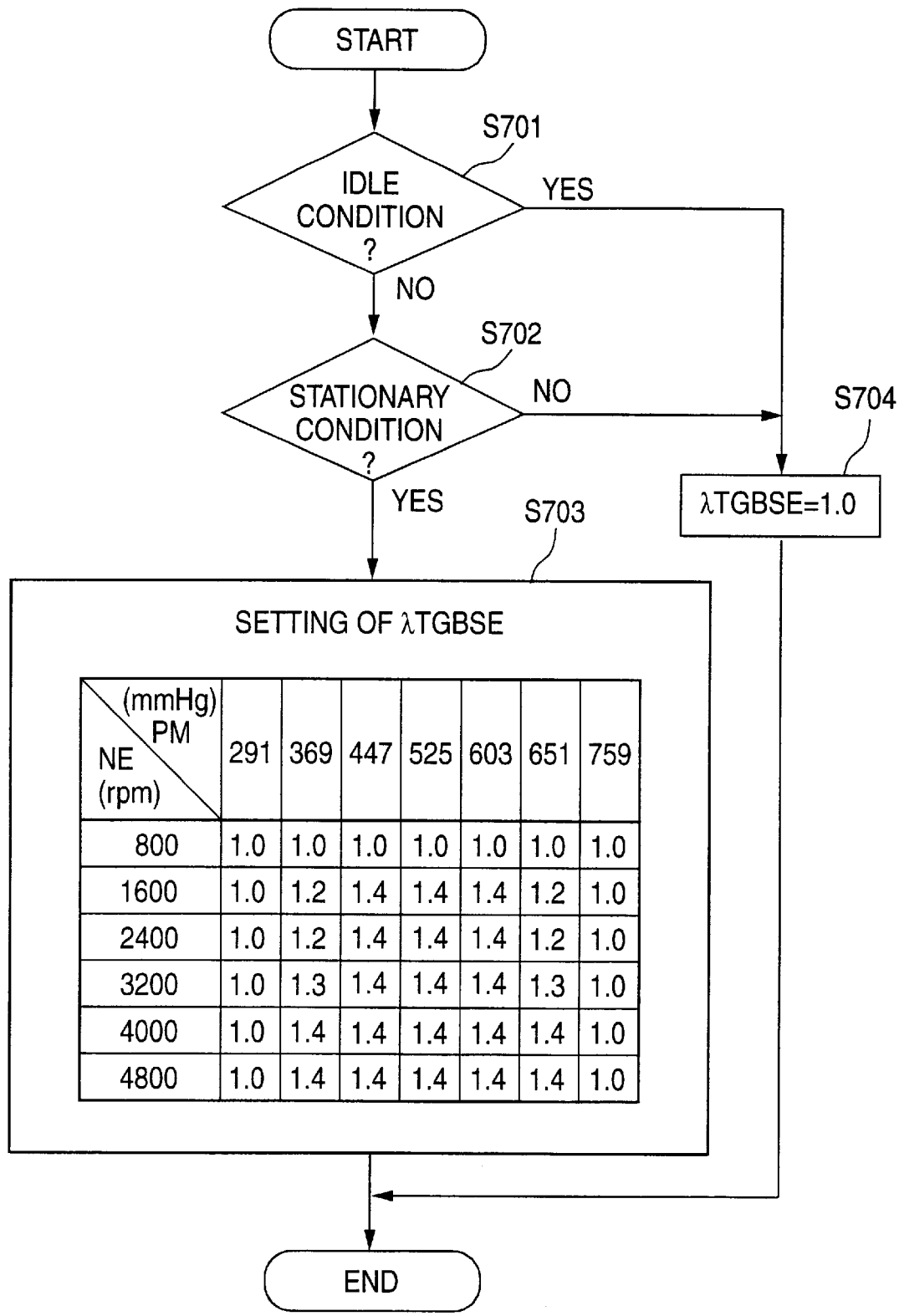
FIG. 16 is a flowchart showing a modified processing procedure for setting the fundamental target air-fuel ratio in accordance with the second embodiment of the present invention.

FIG. 16 is a flowchart showing a modified processing procedure performed in the CPU 31 of the ECU 30 for setting the fundamental target air-fuel ratio in the step S506 of FIG. 12. For this modified embodiment, the air flow meter 5 is replaced by the intake pressure detecting sensor (not shown) disposed downstream of the throttle valve 6 in the intake passage 2 to detect the intake pressure PM. The modified fundamental target air-fuel ratio setting routine shown in FIG. 16 is performed every 360 degrees [° CA] in synchronism with the rotation of the internal combustion engine 1.

In a step S701 of FIG. 16, the CPU 31 makes a judgement as to whether the engine is operated in the idle condition. When the judgement condition is not established (i.e., NO) in the step S701, the CPU 31 proceeds to a step S702 to further make a judgement as to whether the engine is operated in the predetermined stationary condition. Like the first embodiment, the stationary condition of the second embodiment is established when:

the engine speed variation ΔNE is less than 200 [rpm]; and the intake pressure variation ΔPM is less than 100 [mmHg].

When the judgement condition is established (i.e., YES) in the step S702, the CPU 31 proceeds to a step S703 to set the fundamental target air-fuel ratio λTGBSE with reference to the map defined by the parameters of the engine speed NE [rpm] and the intake pressure PM [mmHg]. On the other hand, when the engine is operated in the idle condition (i.e., YES) in the step S701 or when the engine is not operated in the stationary condition (i.e., NO) in the step S702, the CPU 31 proceeds to a step S704 to fix the fundamental target air-fuel ratio λTGBSE to 1 (i.e., λTGBSE=1.0). Then, the CPU 31 completes the routine of FIG. 16.

Figures 17, 18:
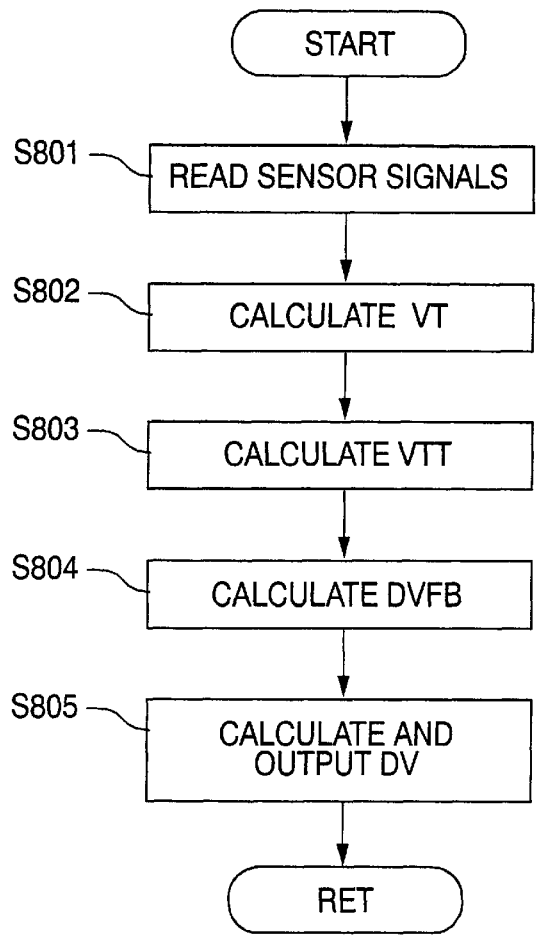
FIG. 17 is a flowchart showing a processing procedure for calculating the control duty in accordance with the second embodiment of the present invention.
FIG. 18 is a map used for calculating the target relative rotational angle based on the engine speed and the intake air amount.

FIG. 17 is a flowchart showing a processing procedure performed in the CPU 31 of the ECU 30 for calculating the control duty with reference to a map of FIG. 18 as well as the maps (graphs) of FIGS. 5 and 6 in accordance with the second embodiment of the present invention. FIG. 18 is the map used for calculating the target relative rotational angle VTT [° CA] based on the engine speed NE [rpm] and the intake air amount GN [g/rev]. The CPU 31 repetitively performs the control duty calculating routine shown in FIG. 17 at predetermined intervals.

In a step S801 of FIG. 17, the CPU 31 reads various sensor signals, including the crank angle signal θ1 sent from the crank position sensor 22, the cam angle signal θ2 sent from the cam position sensor 26, as well as the engine speed NE and the intake air amount GN representing the engine operating conditions. Then, in a step S802, the CPU 31 calculates the actual relative rotational angle VT (=θ1−θ2) based on the crank angle signal θ1 of the crank position sensor 22 and the cam angle signal θ2 of the cam position sensor 26 read in the step S801.

Next, in a step S803, the CPU 31 obtains the target relative rotational angle VTT corresponding to the present target phase difference based on the engine speed NE and the intake air amount GN read in the step S801 with reference to the map of FIG. 18. Then, in a step S804, the CPU 31 calculates the control rotational angle DVFB as the F/B correction amount based on the relative rotational angular deviation (VTT−VT) between the actual relative rotational angle VT calculated in the step S802 and the target relative rotational angle VTT calculated in the step S803 with reference to the map of FIG. 5.

Finally, in a step S805, the CPU 31 calculates the control duty DV based on the retaining duty DVT required for maintaining the actual relative rotational angle VT with reference to the map of FIG. 6. The calculated control duty DV is sent to the OCV 27 to adjust the hydraulic fluid amount supplied to the VVT 25. Then, the CPU 31 completes the routine of FIG. 17.

As apparent from the foregoing description, the above-described second embodiment provides the valve timing control apparatus for an internal combustion engine comprising the crank shaft 21 serving as the driving shaft, the driving force transmitting mechanism (not shown) for transmitting the driving force from the crank shaft 21 to the cam shaft 24 serving as the driven shaft for opening or closing at least one of the intake and exhaust valves 23 and 28. The VVT 25 is provided in the driving force transmitting mechanism for allowing a relative angular displacement between the crank shaft 21 and the cam shaft 24 within a predetermined angle.

A control rotational angle setting means is realized by the CPU 31 of the ECU 30 for setting the control rotational angle DVFB required for optimizing the relative angular displacement in accordance with operating conditions of the internal combustion engine 1. A relative angular displacement means is realized by the CPU 31 of the ECU 30 for causing the VVT 25 to angularly dislocate at least one of the crank shaft 21 and the cam shaft 24 based on the control rotational angle DVFB.

An air-fuel ratio changing means is realized by the CPU 31 of the ECU 30 for adjusting the target air-fuel ratio λTG in accordance with the operating conditions of the internal combustion engine 1.

An air-fuel ratio correcting means is realized by the CPU 31 of the ECU 30 for correcting the air-fuel ratio λTG adjusted by the air-fuel ratio changing means in accordance with the control rotational angle DVFB set by the control rotational angle setting means.

Furthermore, according to the valve timing control apparatus for an internal combustion engine disclosed in the above-described second embodiment, the crank position sensor 22 serves as a driving shaft rotational angle detecting means for detecting a rotational angle (i.e., crank angel θ1) of the crank shaft 21. The cam position sensor 26 serves as a driven shaft rotational angle detecting means for detecting a rotational angle (i.e., cam angle θ2) of the cam shaft 24.

A relative rotational angle calculating means is realized by the CPU 31 of the ECU 30 for calculating the actual relative rotational angle VT representing the angular phase difference between the rotational angle θ1 of the crank shaft 21 detected by the crank position sensor 22 and the rotational angle θ2 of the cam shaft 24 detected by the cam position sensor 26.

A target relative rotational angle calculating means is realized by the CPU 31 of the ECU 30 for calculating the target relative rotational angle VTT representing the target angular phase difference between the rotational angle θ1 of the crank shaft 21 and the rotational angle θ2 of the cam shaft 24 in accordance with the engine speed NE and the intake air amount GN representing the operating conditions of the internal combustion engine 1.

The control rotational angle setting means is for setting the control rotational angle DVFB which is feedback controlled in accordance with the deviation (VTT−VT) between the actual relative rotational angle VT calculated by the relative rotational angle calculating means and the target relative rotational angle VTT calculated by the target relative rotational angle calculating means.

More specifically, the target air-fuel ratio λTG is corrected in the following manner. The fundamental target air-fuel ratio λTGBSE is corrected by using the correction factor VTTc corresponding the target relative rotational angle VTT to obtain the target air-fuel ratio λTG. The air-fuel ratio F/B correction factor FAF is set based on the target air-fuel ratio λTG thus corrected. In other words, the fuel injection amount TAU is corrected considering the target relative rotational angle VTT. Accordingly, the fuel injection amount TAU is changed in response to the change of the target relative rotational angle VTT fed to the VVT 25. This is effective to improve the power output of the internal combustion engine 1 and to stabilize the combustion in the internal combustion engine 1.

Furthermore, according to the valve timing control apparatus for an internal combustion engine disclosed in the above-described second embodiment, the air-fuel ratio correcting means realized by the CPU 31 of the ECU 30 is for correcting the target air-fuel ratio λTG to a stoichiometric (i.e., theoretical) air-fuel ratio when the control rotational angle DVFB is in the advance side.

Namely, when the control rotational angle DVFB fed to the VVT 25 is in the advance side, the air-fuel ratio is fixed to the stoichiometric (i.e., theoretical) air-fuel ratio to improve the power output characteristics. Accordingly, the above-described second embodiment not only improves the power output characteristics of the internal combustion engine 1 by the VVT 25 but also stabilizes the combustion in the internal combustion engine 1.

Third Embodiment

Figure 19:
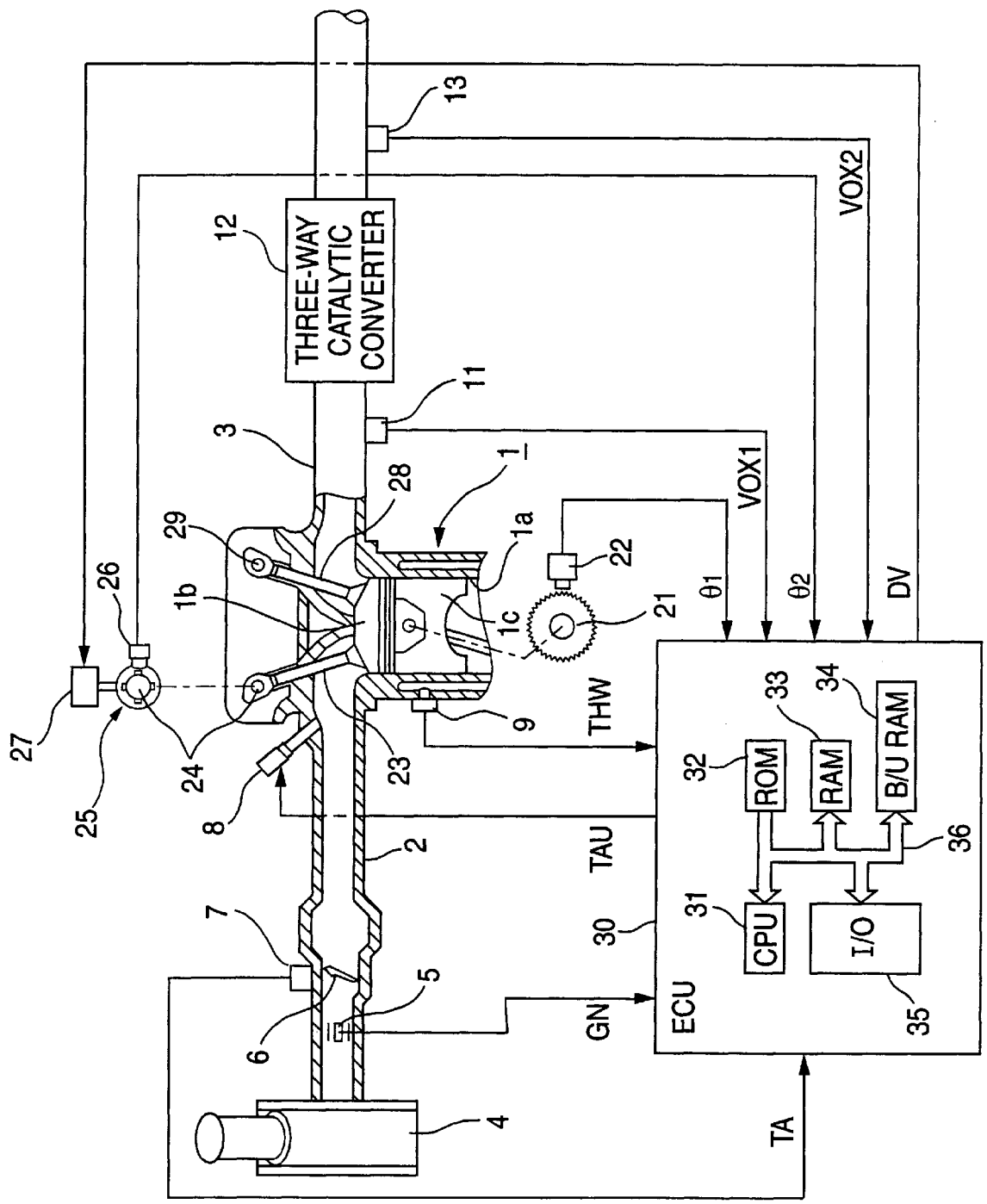
FIG. 19 is a schematic view showing a double overhead cam type internal combustion engine equipped with a valve timing control apparatus and related actuating and sensing devices in accordance with a third embodiment of the present invention.

FIG. 19 is a double overhead cam type internal combustion engine equipped with a valve timing control apparatus and related actuating and sensing devices in accordance with a third embodiment of the present invention. According to the third embodiment, a NOx catalytic converter 14 for exclusively purifying nitrogen oxides (NOx) is disposed downstream of the oxygen sensor 13 in the exhaust passage 3 in addition to the arrangement of the first embodiment.

Figure 20:
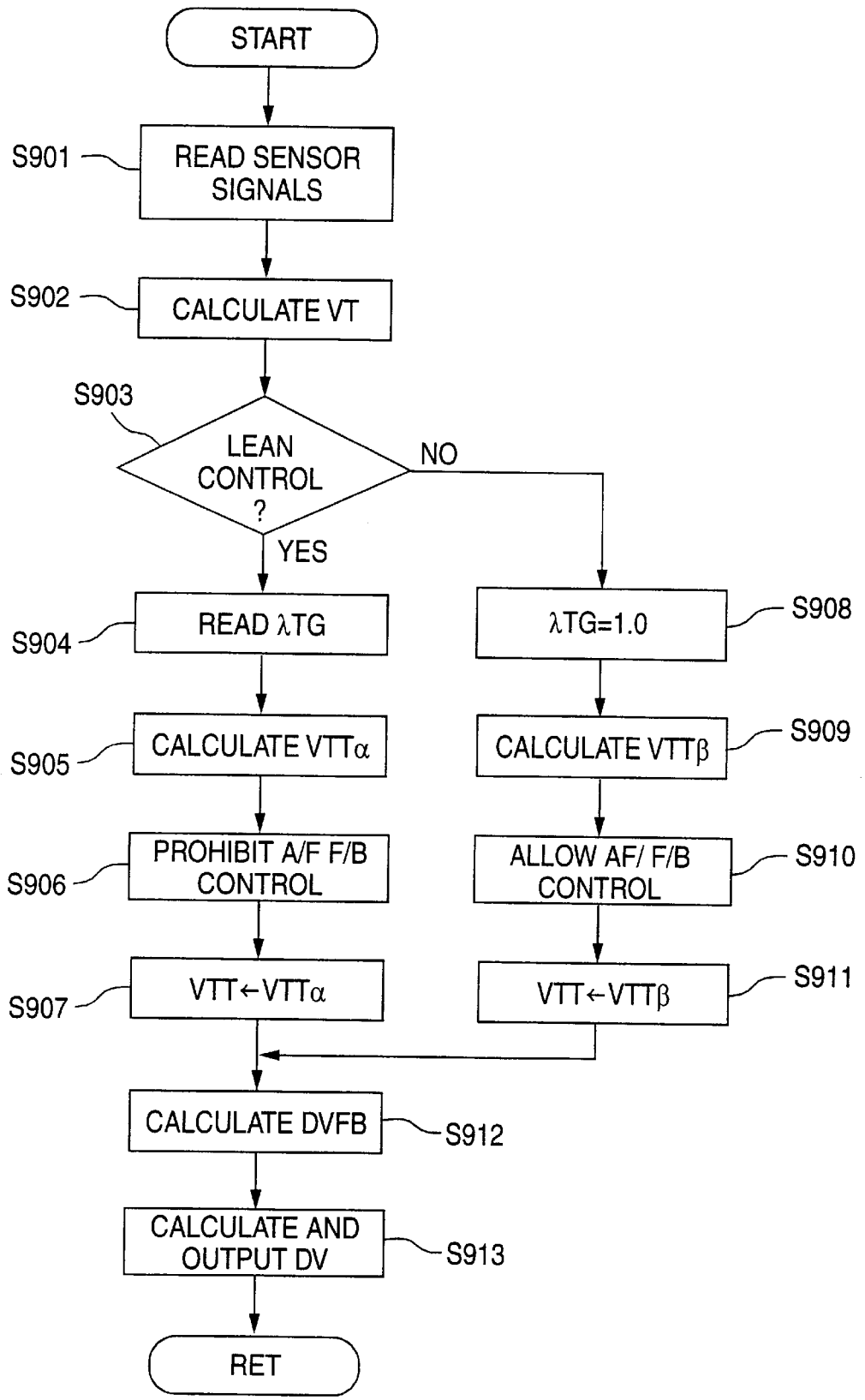
FIG. 20 is a flowchart showing a processing procedure for calculating the control duty in accordance with the third embodiment of the present invention.
Figure 21A:
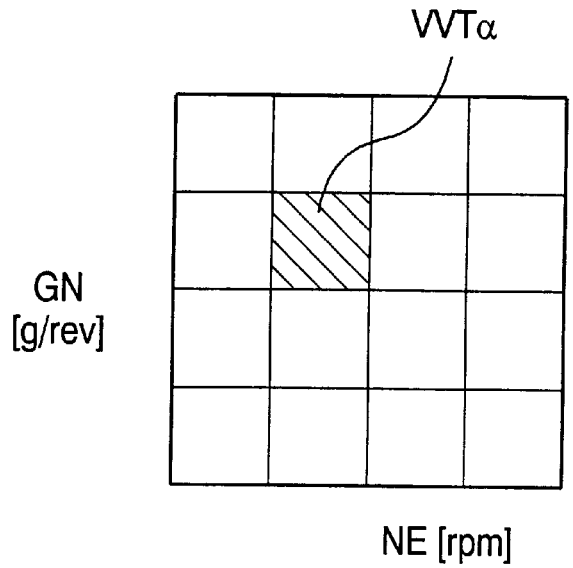
FIGS. 21A and 21B are maps used for calculating the target relative rotational angles based on the engine speed and the intake air amount in accordance with the third embodiment of the present invention.
Figure 21B:
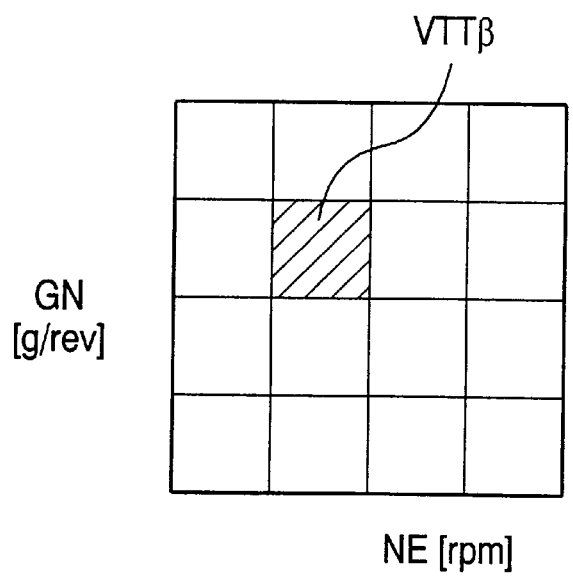

FIG. 20 is a flowchart showing a processing procedure performed in the CPU 31 of the ECU 30 for calculating the control duty with reference to maps of FIGS. 21A and 21B as well as the maps (graphs) of FIGS. 5 and 6 in accordance with the third embodiment of the present invention. FIGS. 21A and 21B are the maps used for calculating the target relative rotational angles VTTα and VVTβ [° CA] based on the engine speed NE [rpm] and the intake air amount GN [g/rev]. The CPU 31 repetitively performs the control duty calculating routine shown in FIG. 20 at predetermined intervals.

In a step S901 of FIG. 20, the CPU 31 reads various sensor signals, including the crank angle signal θ1 sent from the crank position sensor 22, the cam angle signal θ2 sent from the cam position sensor 26, as well as the engine speed NE and the intake air amount GN representing engine operating conditions. Then, in a step S902, the CPU 31 calculates the actual relative rotational angle VT (=θ1−θ2) based on the crank angle signal θ1 of the crank position sensor 22 and the cam angle signal θ2 of the cam position sensor 26 read in the step S901. Then, the CPU 31 proceeds to a step S903 to make a judgement as to whether the internal combustion engine 1 is operated in a lean control mode (at a predetermined lean control region). When the judgement condition is established (i.e., YES) in the step S903, the CPU 31 proceeds to a step S904 to read the target air-fuel ratio λTG being set corresponding to the lean control mode as described later in detail.

Then, the CPU 31 proceeds to a step S905 to calculate the target relative rotational angle VTTα based on the engine speed NE and the intake air amount GN with reference to the map of FIG. 21A. The target relative rotational angle VTTα is a value suitable for the lean control mode. Then, the CPU 31 proceeds to a step S906 to prohibit the air-fuel F/B (feedback) control based on the signal sent from the oxygen sensor 13. In general, the oxygen sensor 13 serves as an auxiliary O$_2$ sensor used in a stoichiometric control mode for the air-fuel ratio wherein the air-fuel ratio is feedback controlled to a stoichiometric (i.e., theoretical) air-fuel ratio. This is why the air-fuel F/B control using the oxygen sensor 13 is prohibited in the lean control mode. Then, the CPU 31 proceeds to a step S907 to store the target relative rotational angle VTTα as a final target relative rotational angle VTT in the RAM 33.

On the other hand, when the judgement condition is not established (NO) in the step S903, i.e., when the engine operating condition is in the stoichiometric region, the CPU 31 proceeds to a step S908 to fix the target air-fuel ratio λTG to 1 (i.e., λTG=1.0). Then, the CPU 31 proceeds to a step S909 to calculate the target relative rotational angle VTTβ based on the engine speed NE and the intake air amount GN with reference to the map of FIG. 21B. The target relative rotational angle VTTβ is a value suitable for the stoichiometric control mode. Then, the CPU 31 proceeds to a step S910 to allow the air-fuel F/B control based on the signal sent from the oxygen sensor 13. Then, the CPU 31 proceeds to a step S911 to store the target relative rotational angle VTTβ as the final target relative rotational angle VTT in the RAM 33.

After storing the final target relative rotational angle VTT in the step S907 or S911, the CPU 31 proceeds to a step S912 to calculate the control rotational angle DVFB as the F/B correction amount based on the relative rotational angular deviation (VTT−VT) between the actual relative rotational angle VT calculated in the step S902 and the final target relative rotational angle VTT calculated in the step S907 or S911 with reference to the map of FIG. 5.

Finally, in a step S913, the CPU 31 calculates the control duty DV based on the retaining duty DVT required for maintaining the actual relative rotational angle VT with reference to the map of FIG. 6. The calculated control duty DV is sent to the OCV 27 to adjust a hydraulic fluid amount supplied to the VVT 25. Then, the CPU 31 completes the routine of FIG. 20.

Figure 22:
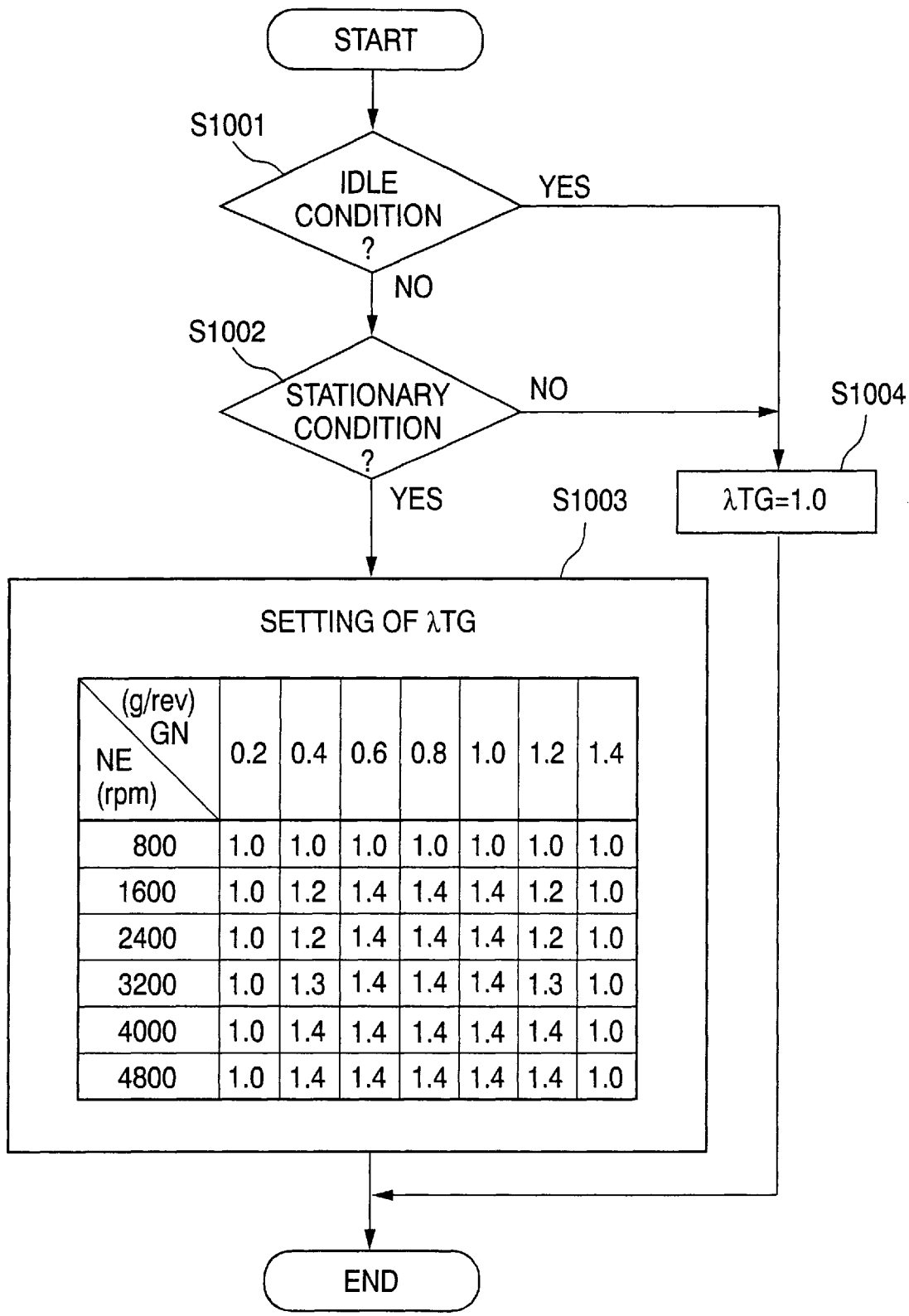
FIG. 22 is a flowchart showing a processing procedure for setting the target air-fuel ratio in accordance with the third embodiment of the present invention.

FIG. 22 is a flowchart showing details of the target air-fuel ratio setting processing procedure in the step S904 of FIG. 20. The air flow meter 5 disposed at the upstream side of the intake passage 2 detects the intake air amount GN. This target air-fuel ratio setting routine shown in FIG. 22 is performed every 360 degrees [° CA] in synchronism with the rotation of the internal combustion engine 1.

In a step S1001 of FIG. 22, the CPU 31 makes a judgement as to whether the engine is operated in the idle condition. When the judgement condition is not established (i.e., NO) in the step S1001, the CPU 31 proceeds to a step S1002 to further make a judgement as to whether the engine is operated in a predetermined stationary condition. According to the third embodiment, the stationary condition is established when:

the engine speed variation ΔNE is less than 200 [rpm]; and an intake air amount variation ΔGN (i.e., a variation of the intake air amount GN) is less than 0.05 [g/rev].

When the judgement condition is established (i.e., YES) in the step S1002, the CPU 31 proceeds to a step S1003 to set the target air-fuel ratio λTG with reference to the map defined by the parameters of the engine speed NE [rpm] and the intake air amount GN [g/rev]. On the other hand, when the engine is operated in the idle condition (i.e., YES) in the step S1001 or when the engine is not operated in the stationary condition (i.e., NO) in the step S1002, the CPU 31 proceeds to a step S1004 to fix the target air-fuel ratio λTG to 1 (i.e., λTG=1.0). Then, the CPU 31 completes the routine of FIG. 22.

Figure 23:
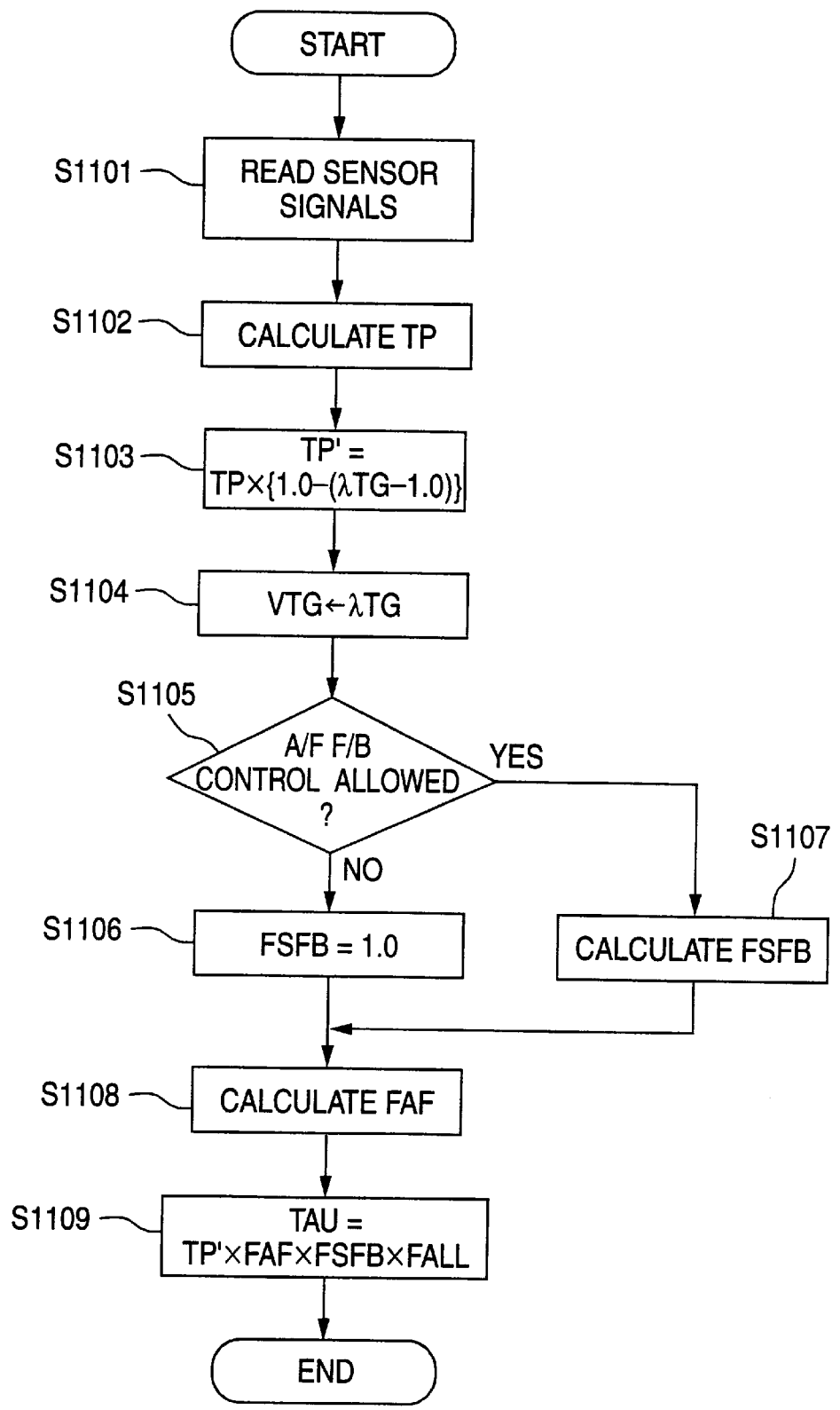
FIG. 23 is a flowchart showing a processing procedure for calculating the fuel injection amount in accordance with the third embodiment of the present invention.
Figure 24:
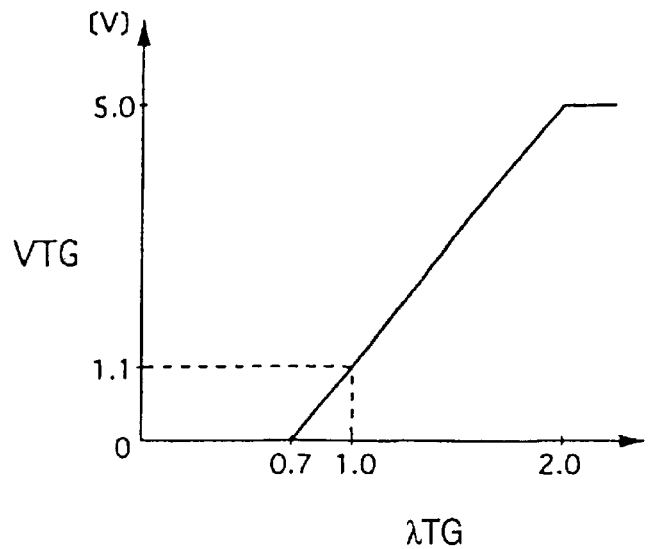
FIG. 24 is a map showing a relationship between the target air-fuel ratio and a target voltage necessary for controlling an A/F sensor used in the third embodiment of the present invention.

FIG. 23 is a flowchart showing a processing procedure performed in the CPU 31 of the ECU 30 for calculating the fuel injection amount with reference to a map of FIG. 24 in accordance with the third embodiment of the present invention. FIG. 24 is the map (graph) showing a relationship between the target air-fuel ratio λTG and a target voltage VTG [V] necessary for controlling the A/F sensor 11. The CPU 31 repetitively performs the fuel injection amount setting routine shown in FIG. 23 every 360 degrees [° CA] in synchronism with the rotation of the internal combustion engine 1.

In a step S1101 of FIG. 23, the CPU 31 reads various sensor signals including the engine speed NE and the intake air amount GN. Next, in a step S1102, the CPU 31 calculates a fundamental fuel injection amount TP based on the various sensor signals read in the step S1101. Then, in a step S1103, the CPU 31 calculates a fundamental fuel injection amount TP' by modifying the fundamental fuel injection amount TP based on the target air-fuel ratio λTG being set in the routine of FIG. 22 in accordance with the following equation (3).

$$TP'=TP\times\{1.0-(\lambda TG-1.0)\} \tag{3}$$

Next, in a step S1104, the CPU 31 sets the target voltage VTG necessary for controlling the A/F sensor 11 based on the target air-fuel ratio λTG being set in the routine of FIG. 22 with reference to the map of FIG. 24. Then, in a step S1105, the CPU 31 makes a judgement as to whether the air-fuel ratio F/B control by the oxygen sensor 13 is allowed. When the judgement condition is not established (i.e., NO)

in the step S1105, i.e., when the engine is operated in the lean control mode, the air-fuel ratio F/B control by the oxygen sensor 13 is prohibited. Hence, the CPU 31 proceeds to a step S1106 to fix an air-fuel ratio F/B correction factor FSFB for the oxygen sensor 13 to 1 (i.e., FSFB=1.0).

On the other hand, when the judgement condition is established (i.e., YES) in the step S1105, i.e., when the engine is operated in the stoichiometric control mode, the air-fuel ratio F/B control by the oxygen sensor 13 is allowed. Hence, the CPU 31 proceeds to a step S1107 to calculate the air-fuel ratio F/B correction factor FSFB in accordance with behavior of the oxygen sensor 13.

After setting the air-fuel ratio F/B correction factor FSFB in the step S1106 or S1107, the CPU 31 proceeds to a step S1108 to calculate the air-fuel ratio F/B correction factor FAF according to the target air-fuel ratio λTG based on the signal sent from the A/F sensor 11. Then, in a step S1109, the CPU calculates the fuel injection amount TAU based on the fundamental fuel injection amount TP', the air-fuel ratio F/B correction factors FAF and FSFB and other correction factor FALL in accordance with the following equation (4).

$$TAU=TP'\times FAF\times FSFB\times FALL \quad (4)$$

Then, the CPU 31 completes the routine of FIG. 23.

A control signal, corresponding to the fuel injection amount TAU set in the step S1109, is sent to the fuel injector 8 to control the valve opening time determining an actual fuel injection amount. As a result, the air-fuel ratio of the gas mixture introduced into the combustion chamber 1b is equalized to the target air-fuel ratio λTG.

Figure 25:
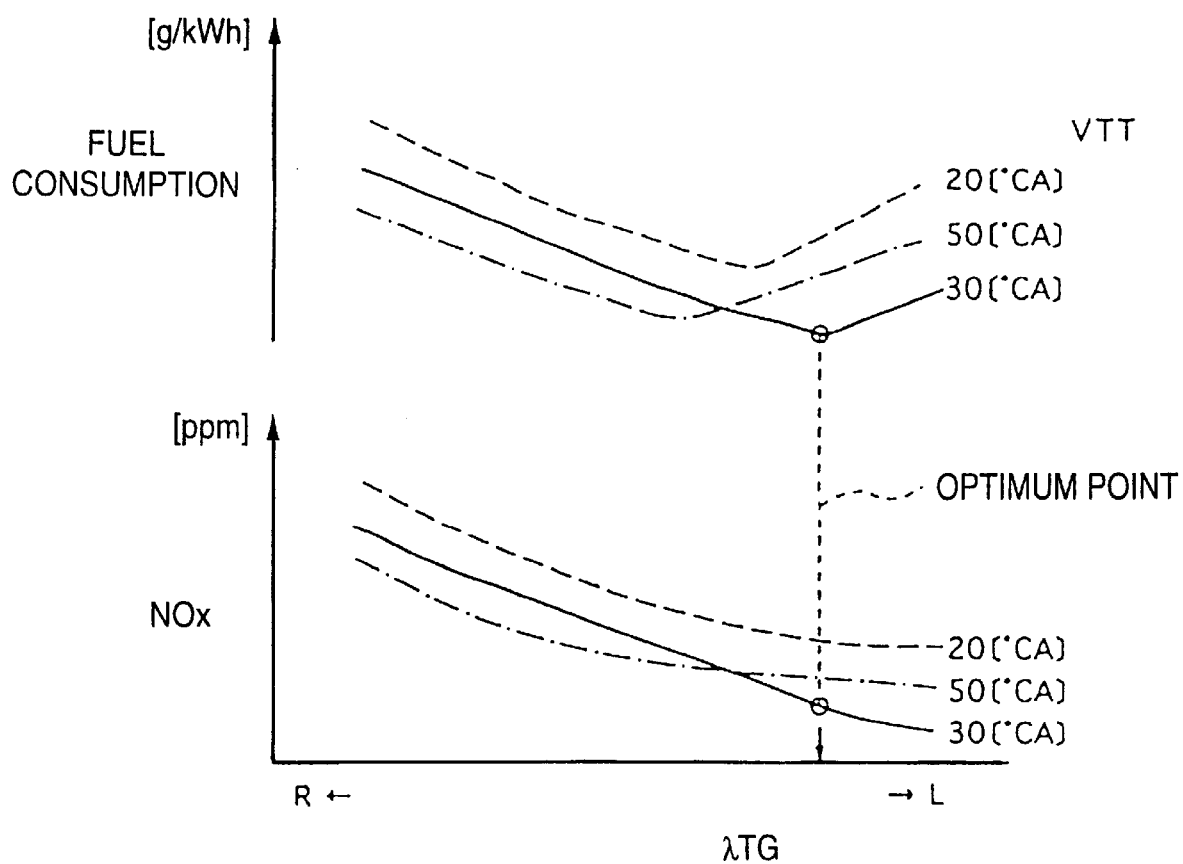
FIG. 25 is a graph showing a fuel consumption rate and a generated NOx amount in relation to the target air-fuel ratio according to various values of the target relative rotational angle in the third embodiment of the present invention.

As practically obtained engine performance data according to the embodiment of the present invention, FIG. 25 shows a fuel consumption rate [g/kWh] and a generated amount of the nitrogen oxides NOx [ppm] in relation to the target air-fuel ratio λTG according to various values of the target relative rotational angle VTT [° CA] representing the overlap between the opening periods of the intake and exhaust valves 23 and 28. Considering the relationship shown in FIG. 25, the target air fuel ratio λTG and the target relative rotational angle VVT are obtained so as to optimize the fuel consumption rate and the generated nitrogen oxides NOx.

As apparent from the foregoing description, the above-described third embodiment provides the valve timing control apparatus for an internal combustion engine comprising the crank shaft 21 serving as the driving shaft, the driving force transmitting mechanism (not shown) for transmitting the driving force from the crank shaft 21 to the cam shaft 24 serving as the driven shaft for opening or closing at least one of the intake and exhaust valves 23 and 28. The VVT 25 is provided in the driving force transmitting mechanism for allowing a relative angular displacement between the crank shaft 21 and the cam shaft 24 within a predetermined angle.

The three-way catalytic converter 12 serves as a first catalytic converter disposed in the exhaust passage 3 of the internal combustion engine 1 for purifying carbon monoxide (CO), hydrocarbon (HC), and nitrogen oxides (NOx) contained in the exhaust gas during the stoichiometric control mode for the air-fuel ratio. The NOx catalytic converter 14 serves as a second catalytic converter disposed in the exhaust passage 3 of the internal combustion engine 1 for purifying the nitrogen oxides (NOx) contained in the exhaust gas during the lean control mode for the air-fuel ratio.

A control region judging means is realized by the CPU 31 of the ECU 30 for judging whether present engine operating conditions are in the stoichiometric control region or in the lean control region.

A target air-fuel ratio calculating means is realized by the CPU 31 of the ECU 30 for calculating the target air-fuel ratio λTG in accordance with a judgement by the control region judging means.

An air-fuel ratio changing means is realized by the CPU 31 of the ECU 30 for adjusting the air-fuel ratio to the target air-fuel ratio λTG by selectively using the three-way catalytic converter 12 and the NOx catalytic converter 14 corresponding to the target air-fuel ratio λTG calculated by the target air-fuel ratio calculating means, thereby purifying the exhaust gas.

The crank position sensor 22 serves as a driving shaft rotational angle detecting means for detecting the rotational angle θ1 of the crank shaft 21. The cam position sensor 26 serves as the driven shaft rotational angle detecting means for detecting the rotational angel θ2 of the cam shaft 24.

A relative rotational angle calculating means is realized by the CPU 31 of the ECU 30 for calculating the actual relative rotational angle VT representing the angular phase difference between the rotational angel θ1 of the crank shaft 21 detected by the crank position sensor 22 and the rotational angle θ2 of the cam shaft 24 detected by the cam position sensor 26.

A target relative rotational angle calculating means is realized by the CPU 31 of the ECU 30 for calculating the target relative rotational angle VTT representing the target angular phase difference between the rotational angle θ1 of the crank shaft 21 and the rotational angel θ2 of the cam shaft 24 in accordance with the engine operating conditions, in response to the air-fuel ratio adjusted by the air-fuel ratio changing means.

A control rotational angle setting means is realized by the CPU 31 of the ECU 30 for setting the control rotational angle DVFB required for optimizing the relative angular displacement in accordance with the deviation (VTT−VT) between the actual relative rotational angle VT calculated by the relative rotational angle calculating means and the target relative rotational angle VTT calculated by the target relative rotational angle calculating means.

A relative rotational angle control means is realized by the CPU 31 of the ECU 30 for causing the VVT 25 to adjust the relative angular displacement between the crank shaft 21 and the cam shaft 24 in accordance with the control rotational angle DVFB.

Namely, the exhaust passage 3 of the internal combustion engine 1 is equipped with the three-way catalytic converter 12 and the NOx catalytic converter 14. When the internal combustion engine 1 is operated in the stoichiometric control mode at the stoichiometric control region, both the A/F sensor 11 and the oxygen sensor 13 are used for purifying the carbon monoxide (CO), the hydrocarbon (HC), and the nitrogen oxides (NOx) contained in the exhaust gas. On the other hand, when the internal combustion engine 1 is operated in the lean control mode at the lean control region, i.e., when the lean burn control is performed to improve the fuel economy, the air-fuel ratio F/B control by the oxygen sensor 13 is prohibited and the nitrogen oxides in the exhaust gas are purified by the NOx catalytic converter 14. The three-way catalytic converter 12 and the NOx catalytic converter 14 are selectively used to purify the exhaust gas in accordance with the target air-fuel ratio λTG in accordance with the engine operating conditions. The VVT 25 receives the control rotational angle DVFB responsive to the change of the air-fuel ratio equalized to the target air-fuel ratio λTG. Furthermore, the air-fuel ratio F/B correction factor FAF is set by using the target air-fuel ratio λTG. As a result, the fuel injection amount TAU is adequately set. The combustion in the internal combustion engine 1 can be stabilized. The power output characteristics can be improved. The exhaust gas purification can be effectively performed in accordance with the type of the engine operation mode, i.e., stoichiometric mode or lean control mode.

Furthermore, according to the valve timing control apparatus for an internal combustion engine disclosed in the above-described third embodiment, both the target air-fuel ratio calculating means and the target relative rotational angle calculating means are realized by the CPU 31 of the ECU 30 for calculating the target air-fuel ratio λTG and the target relative rotational angle VTT based on the engine speed NE and the intake air amount GN of the internal combustion engine 1.

Accordingly, when the VVT 25 is incorporated in the so-called L-Jetronic type electronically controlled fuel injection system, the engine speed NE is detected based on the crank angle signal θ1 sent from the crank position sensor 22 and the air intake amount GN is detected by the air flow meter 5. By using the maps defined by these parameters, the target air-fuel ratio λTG and the target relative rotational angle VTT are easily calculated.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A valve timing control apparatus for an internal combustion engine comprising a driving shaft, a driving force transmitting mechanism for transmitting a driving force from said driving shaft to a driven shaft for opening or closing at least one of intake and exhaust valves, said valve timing control apparatus comprising:

a variable valve timing control device provided in said driving force transmitting mechanism for allowing a relative angular displacement between said driving shaft and said driven shaft within a predetermined angle;

control rotational angle setting means for setting a control rotational angle required for optimizing said relative angular displacement in accordance with operating conditions of said internal combustion engine;

relative angular displacement means for causing said variable valve timing control device to angularly dislocate at least one of said driving shaft and said driven shaft based on said control rotational angle;

air-fuel ratio changing means for adjusting an air-fuel ratio in accordance with the operating conditions of said internal combustion engine; and air-fuel ratio correcting means for correcting said air-fuel ratio adjusted by said air-fuel ratio changing means in accordance with said control rotational angle set by said control rotational angle setting means.

2. The valve timing control apparatus for an internal combustion engine in accordance with claim 1, further comprising:

driving shaft rotational angle detecting means for detecting a rotational angle of said driving shaft;

driven shaft rotational angle detecting means for detecting a rotational angle of said driven shaft;

relative rotational angle calculating means for calculating a relative rotational angle representing an angular phase difference between said rotational angle of said driving shaft detected by said driving shaft rotational angle detecting means and said rotational angle of said driven shaft detected by said driven shaft rotational angle detecting means; and target relative rotational angle calculating means for calculating a target relative rotational angle representing a target angular phase difference between the rotational angle of said driving shaft and the rotational angle of said driven shaft in accordance with the operating conditions of said internal combustion engine, wherein said control rotational angle setting means is for setting said control rotational angle in accordance with a deviation between said relative rotational angle calculated by said relative rotational angle calculating means and said target relative rotational angle calculated by said target relative rotational angle calculating means.

3. The valve timing control apparatus for an internal combustion engine in accordance with claim 1, wherein said air-fuel ratio correcting means is for correcting said air-fuel ratio to a stoichiometric air-fuel ratio when said control rotational angle is in an advance side.

* * * * *